US011668883B2

(12) United States Patent
Watte et al.

(10) Patent No.: US 11,668,883 B2
(45) Date of Patent: Jun. 6, 2023

(54) OPTICAL FIBER CONNECTION SYSTEM INCLUDING OPTICAL FIBER ALIGNMENT DEVICE WITH OPTICAL FIBER CLEANER

(71) Applicant: CommScope Connectivity Belgium BVBA, Kessel-Lo (BE)

(72) Inventors: Jan Watte, Grimbergen (BE); Stefano Beri, Zaventem (BE); Danny Willy August Verheyden, Gelrode (BE); Sangram Keshari Samal, Orissa (IN); Ana Margarida Doamaral Cardoso Dos Santos, Aalst (BE); Peter Martha Dubruel, Oudenaarde (BE); Ana Nedelcheva Hristova, Holsbeek (BE)

(73) Assignee: COMMSCOPE CONNECTIVITY BELGIUM BVBA

( * ) Notice: Subject to any disclaimer, the term of this patent is extended or adjusted under 35 U.S.C. 154(b) by 54 days.

(21) Appl. No.: 17/316,122

(22) Filed: May 10, 2021

(65) Prior Publication Data
US 2021/0333481 A1 Oct. 28, 2021

Related U.S. Application Data

(63) Continuation of application No. 16/806,318, filed on Mar. 2, 2020, now Pat. No. 11,002,922, which is a continuation of application No. 15/687,665, filed on Aug. 28, 2017, now Pat. No. 10,578,810, which is a continuation of application No. 14/764,494, filed as
(Continued)

(51) Int. Cl.
*G02B 6/38* (2006.01)

(52) U.S. Cl.
CPC ........ *G02B 6/3866* (2013.01); *G02B 6/3809* (2013.01); *G02B 6/3841* (2013.01); *G02B 6/3843* (2013.01); *G02B 6/3849* (2013.01); *G02B 6/3893* (2013.01)

(58) Field of Classification Search
CPC .. G02B 6/3866; G02B 6/3809; G02B 6/3841; G02B 6/3843; G02B 6/3849; G02B 6/3893
See application file for complete search history.

(56) References Cited

U.S. PATENT DOCUMENTS

| 4,208,093 A | 6/1980 | Borsuk |
| 4,244,681 A | 1/1981 | Comerford et al. |

(Continued)

FOREIGN PATENT DOCUMENTS

| EP | 2 549 313 A1 | 1/2013 |
| EP | 2 549 314 A1 | 1/2013 |

(Continued)

OTHER PUBLICATIONS

International Search Report for International Application No. PCT/EP2014/051711 dated Mar. 24, 2014 (2 pages).
(Continued)

*Primary Examiner* — Sung H Pak
*Assistant Examiner* — Hoang Q Tran
(74) *Attorney, Agent, or Firm* — Merchant & Gould P.C.

(57) ABSTRACT

The present disclosure relates to system and method for cleaning an end face of a bare optical fiber (100). The system and methods include inserting the end face of the bare optical fiber (100) through a layer of material (500) that includes electrospun fibers.

18 Claims, 22 Drawing Sheets

Related U.S. Application Data application No. PCT/EP2014/051711 on Jan. 29, 2014, now Pat. No. 9,885,839.

(60) Provisional application No. 61/885,850, filed on Oct. 2, 2013, provisional application No. 61/758,150, filed on Jan. 29, 2013.

(56) References Cited

U.S. PATENT DOCUMENTS

| | | | |
|---|---|---|---|
| 4,708,432 | A | 11/1987 | Berg |
| 4,807,957 | A | 2/1989 | de Jong et al. |
| 5,125,056 | A * | 6/1992 | Hughes ................ G02B 6/3823 385/59 |
| 5,202,949 | A | 4/1993 | Hileman et al. |
| 5,400,060 | A | 3/1995 | Carlotta |
| 5,694,506 | A | 12/1997 | Kobayashi et al. |
| 6,516,131 | B1 | 2/2003 | Tullis |
| 6,547,444 | B2 | 4/2003 | Kiani |
| 6,623,174 | B2 | 9/2003 | Perko et al. |
| 6,986,607 | B2 | 1/2006 | Roth et al. |
| 7,824,109 | B2 | 11/2010 | Tanaka et al. |
| 7,985,461 | B2 | 7/2011 | Hashimoto et al. |
| 8,251,592 | B2 | 8/2012 | Wu |
| 8,985,864 | B2 | 3/2015 | Ott |
| 8,998,503 | B2 | 4/2015 | Barnette, Jr. et al. |
| 2007/0230874 | A1 | 10/2007 | Lin |
| 2011/0229088 | A1 | 9/2011 | Isenhour et al. |
| 2011/0244248 | A1 * | 10/2011 | Liu ...................... C03C 17/007 977/778 |
| 2012/0141071 | A1 | 6/2012 | Duis et al. |
| 2013/0183001 | A1 * | 7/2013 | Ott .......................... B08B 1/006 385/72 |
| 2014/0124140 | A1 | 5/2014 | Verheyden et al. |
| 2014/0341511 | A1 | 11/2014 | Daems et al. |
| 2015/0063759 | A1 | 3/2015 | Barnette, Jr. et al. |

FOREIGN PATENT DOCUMENTS

| | | |
|---|---|---|
| GB | 2 300 978 | 11/1996 |
| JP | H03-175406 | 7/1991 |
| JP | 8-211235 | 8/1996 |
| JP | 2000-304949 | 11/2000 |
| JP | 2005-202224 | 7/2005 |
| WO | WO 83/00935 | 3/1983 |
| WO | WO 2011/047002 | 4/2011 |
| WO | WO 2012/112343 | 8/2012 |
| WO | WO 2013/036843 A2 | 3/2013 |
| WO | WO 2013/117598 A2 | 8/2013 |

OTHER PUBLICATIONS

International Search Report for International Application No. PCT/EP2014/051712 dated Apr. 29, 2014 (3 pages).

NTTAT Integrated Value Provider—Free Bending Optical Cord, http://www.ntt-at.com/product/fboc—copyright 2000-2013. Known prior art.

U.S. Appl. No. 14/377,189, filed Aug. 7, 2014 entitled: Optical Fiber Connection System Including Optical Fiber Alignment Device.

* cited by examiner

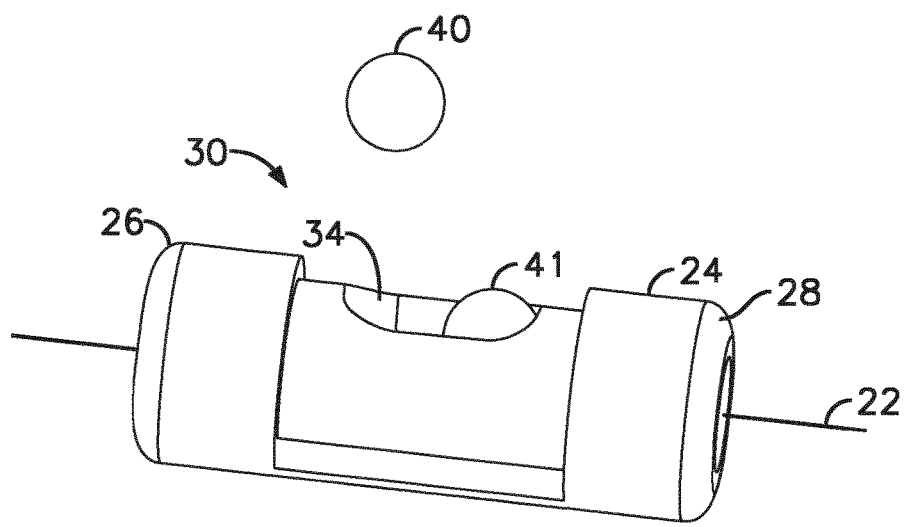
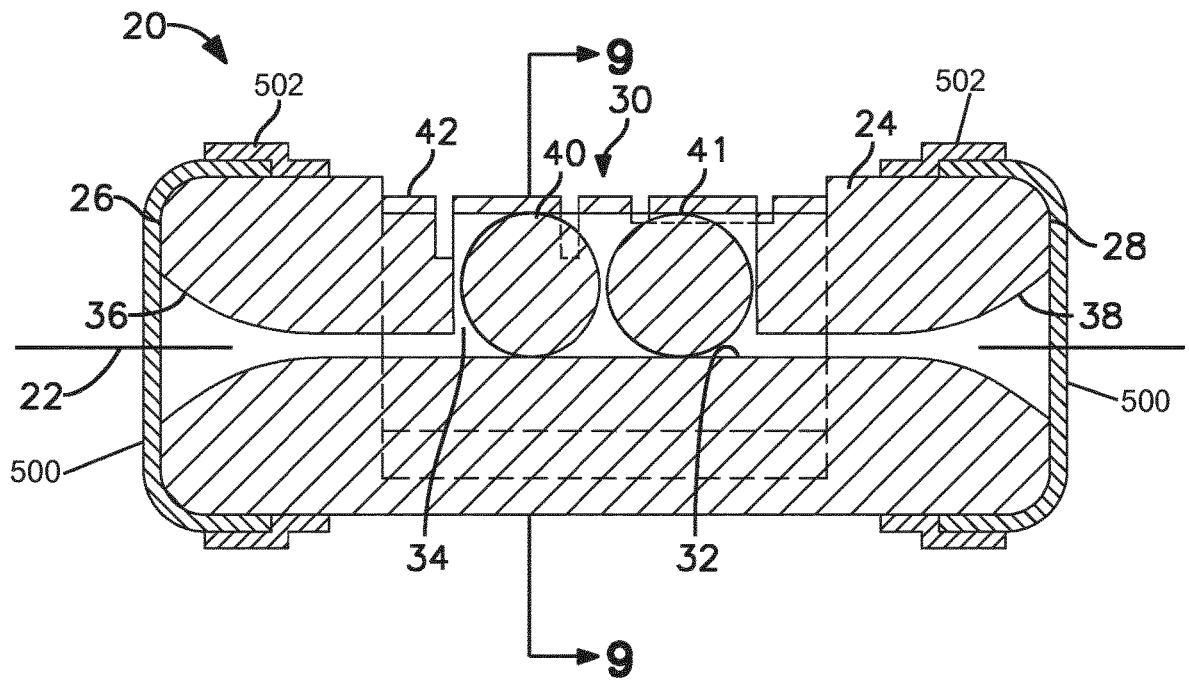

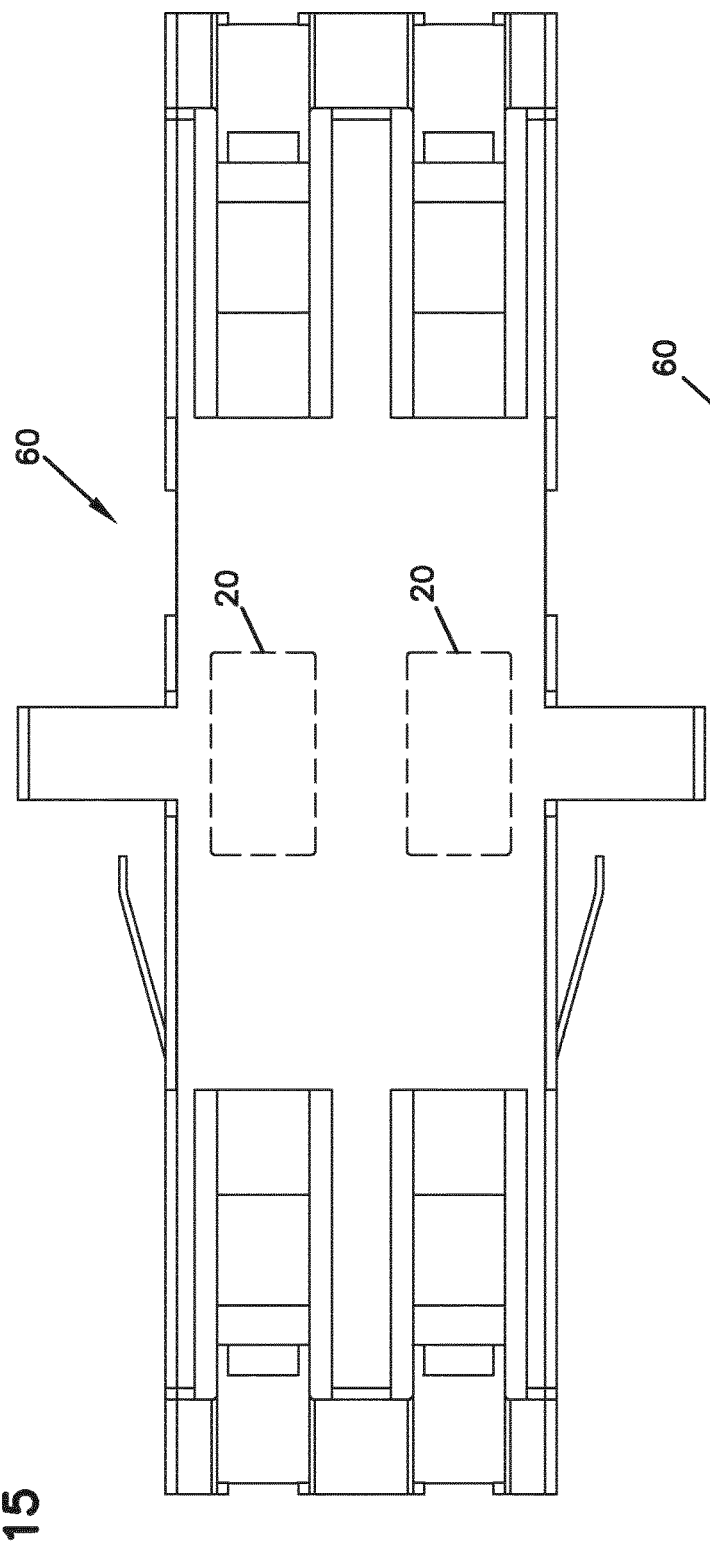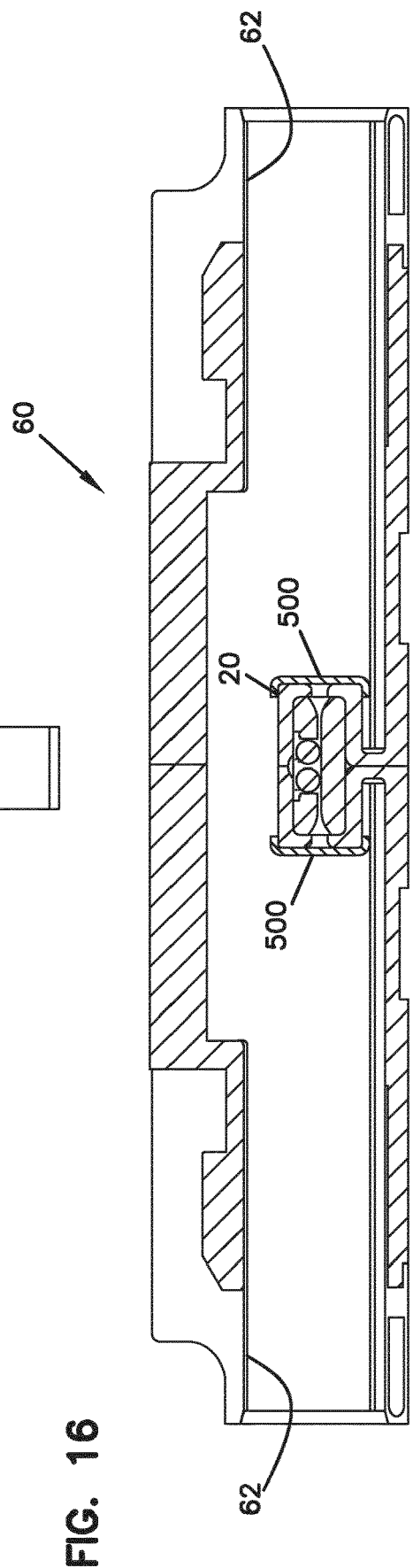
FIG. 15
FIG. 16

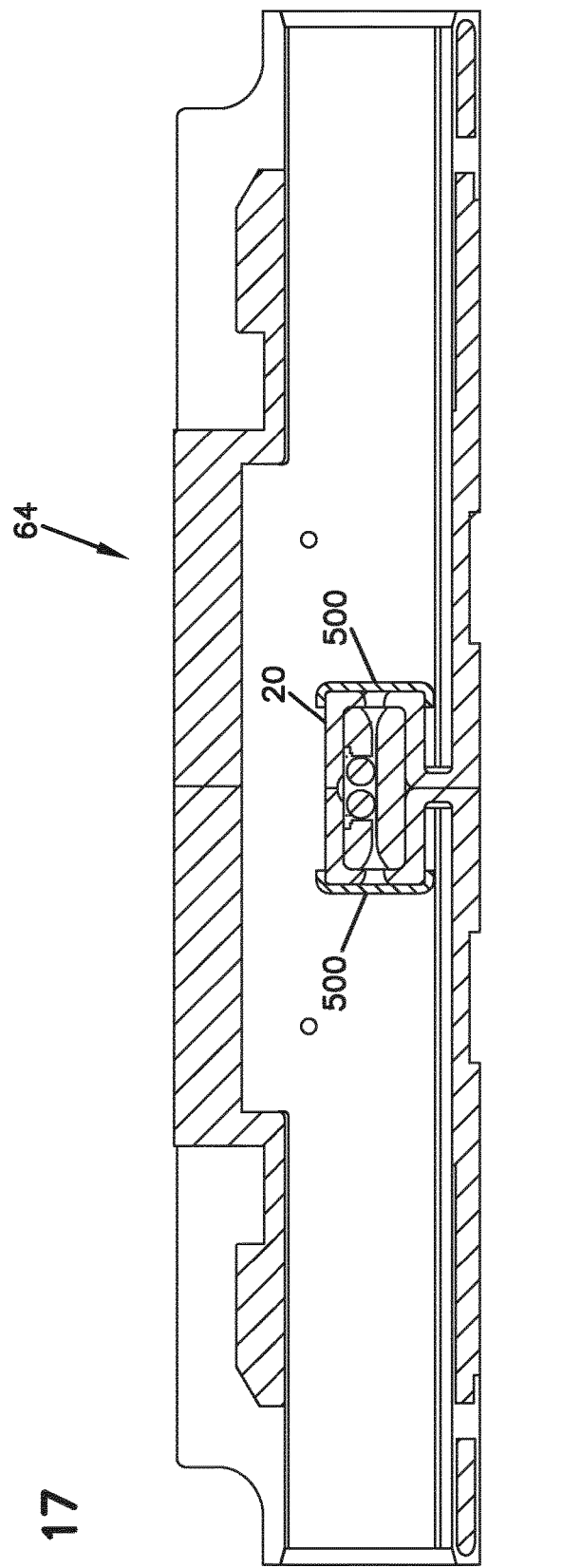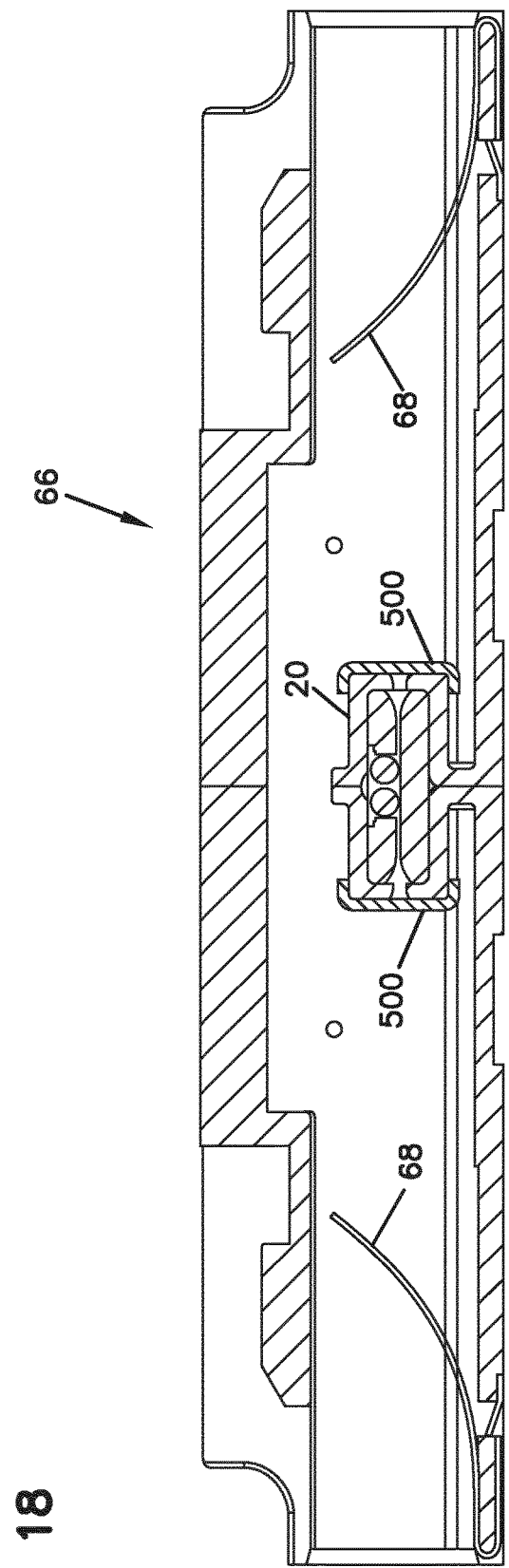

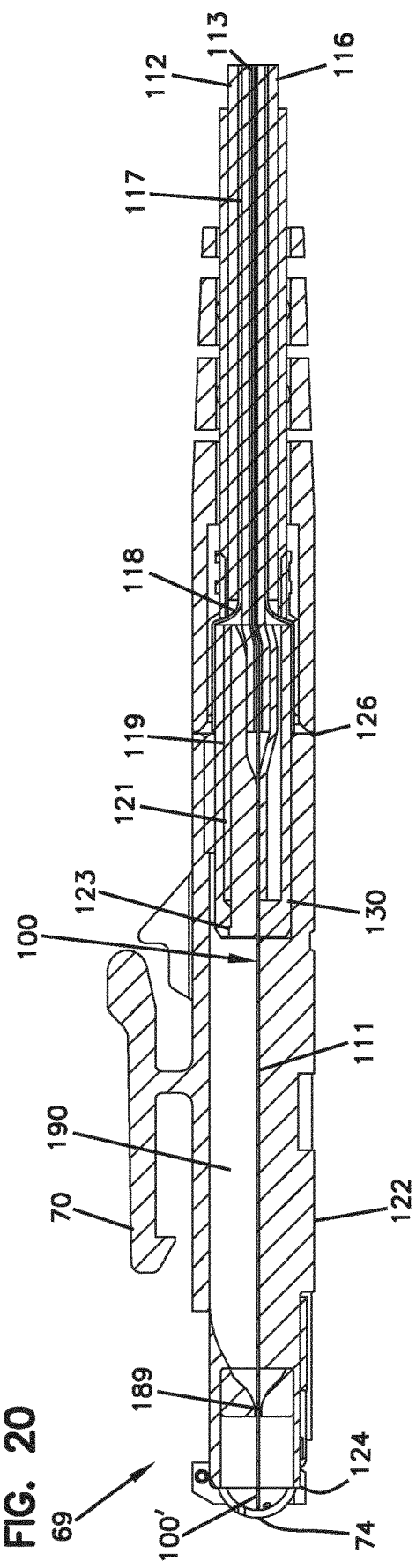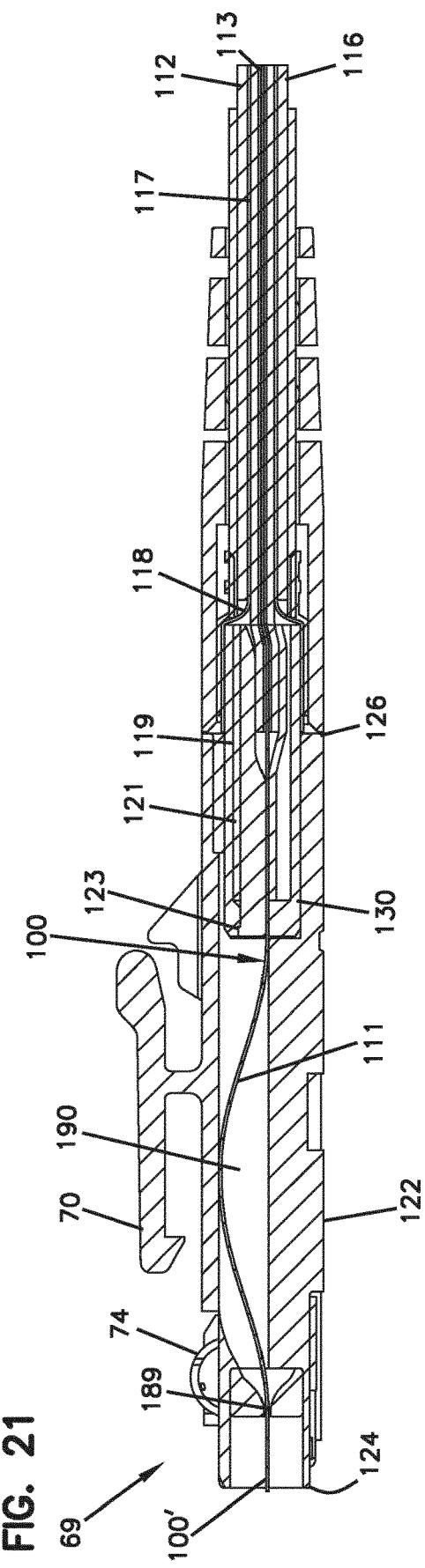

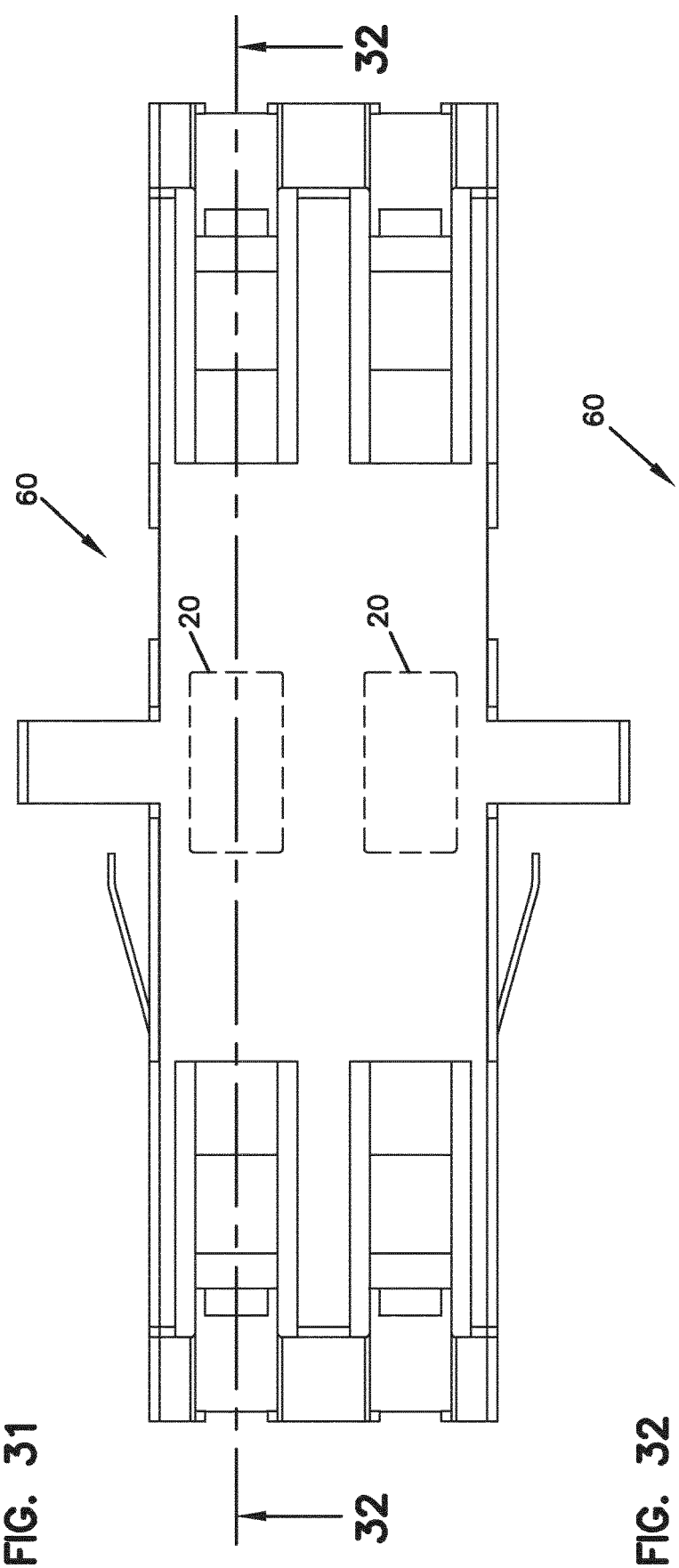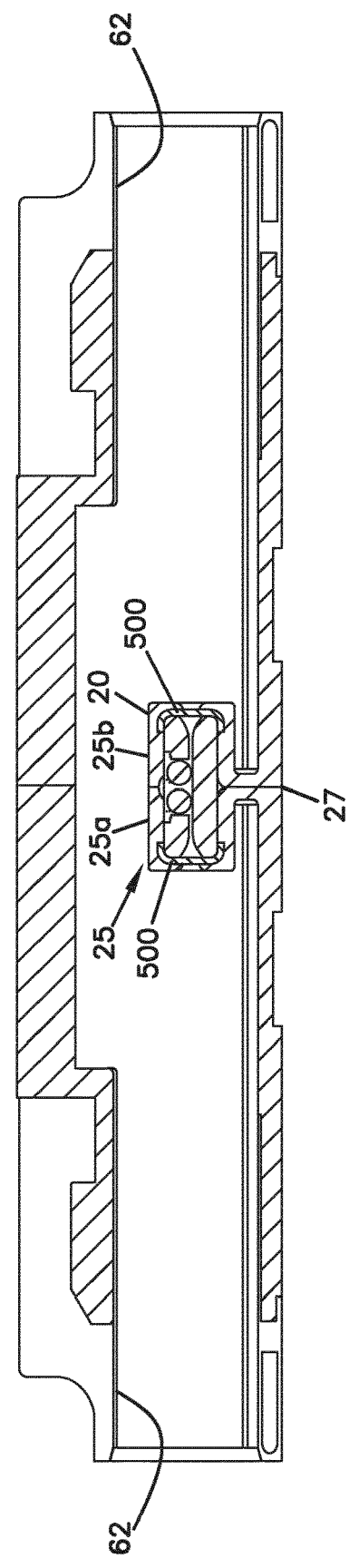

OPTICAL FIBER CONNECTION SYSTEM INCLUDING OPTICAL FIBER ALIGNMENT DEVICE WITH OPTICAL FIBER CLEANER

This application is a Continuation of U.S. patent application Ser. No. 16/806,318, filed 2 Mar. 2020, now U.S. Pat. No. 11,002,922, which is a Continuation of U.S. patent application Ser. No. 15/687,665, filed 28 Aug. 2017, now U.S. Pat. No. 10,578,810, which is a Continuation of U.S. patent application Ser. No. 14/764,494, filed 29 Jul. 2015, now U.S. Pat. No. 9,885,839, which is a National Stage Application of PCT/EP2014/051711, filed 29 Jan. 2014, which claims benefit of U.S. Provisional Application Ser. No. 61/758,150, filed 29 Jan. 2013 and U.S. Provisional Application Ser. No. 61/885,850, filed 2 Oct. 2013 and which applications are incorporated herein by reference. To the extent appropriate, a claim of priority is made to each of the above disclosed applications.

TECHNICAL FIELD

The present disclosure relates to optical fiber connection systems and to devices and methods for aligning two fibers end-to-end.

BACKGROUND

Modern optical devices and optical communications systems widely use fiber optic cables. Optical fibers are strands of glass fiber processed so that light beams transmitted through the glass fiber are subject to total internal reflection wherein a large fraction of the incident intensity of light directed into the fiber is received at the other end of the fiber.

Many approaches to achieve fiber alignment can be found in the prior art, among them are V-grooves and ferrules. Ferrule based alignment systems including include ferruled connectors which use cylindrical plugs (referred to as ferrules) that fit within an alignment sleeve (e.g., a cylindrical split sleeve with elastic characteristics) to perform fiber alignment. Precision holes are drilled or molded through the centers of the ferrules. Optical fibers are secured (e.g., potted) within the precision holes with polished ends of the optical fibers located at end faces of the ferrules. Precise fiber alignment depends on the accuracy of the central hole of each ferrule. Fiber alignment occurs when two ferrules are inserted into an alignment sleeve such that the end faces of the ferrules oppose one another and the optical fibers supported by the ferrules are co-axially aligned with one another. Normally, ferruled connectors use ceramic or metal ferrules in which the precision center holes are drilled. Disadvantageously, drilling of such a central hole that is accurate enough for aligning can be difficult. In addition, a connector containing a ferrule has very high manufacturing costs. Therefore looking for adequate alignment solutions containing ferrule-less connectors would be more desirable.

V-grooves are commonly used in prior-art ferrule-less fiber optic alignment devices. An example is the V-groove method described in U.S. Pat. No. 6,516,131 used for alignment of optical fiber ends. The V-groove is uni-directionally or bi-directionally tapered for enabling easy positioning of the fibers. Optical fibers are pressed into the V-grooves and line contact between the optical fibers and the surfaces of the V-grooves assists in providing precise alignment of the optical fibers. In one example, two optical fibers desired to be optically connected together are positioned end-to-end within a V-groove such that the V-groove functions to co-axially align the optical fibers. End faces of the aligned optical fibers can abut one another.

For optical couplings to be effective, it is important for the end faces of the optical fiber being coupled together to be clean. Improvements are needed in this area.

SUMMARY

One aspect of the present disclosure relates to structures and methods for cleaning optical fibers. In certain examples, the cleaning structures can be incorporated into optical fiber alignment devices configured for co-axially aligning two fibers end-to-end. In certain examples, the cleaning structures can be incorporated into mechanical splicing devices. In certain examples, the cleaning structures can be incorporated into fiber optic adapters. In certain examples, the cleaning structures are configured to clean (e.g., remove particulate, liquid, and/or other contaminants) from an optical fiber.

In certain examples, the cleaning structures are configured to inhibit contaminants from entering an alignment device. For example, an optical fiber can be plugged into a first adapter port and pierce a cleaning structure at a first end of an optical fiber alignment device while an opposite adapter port remains empty. In such an example, a cleaning structure at an opposite end of the alignment device can inhibit contaminants from entering the alignment device and/or contaminating the optical fiber received at the first end of the alignment device. Accordingly, in certain implementations, dust caps need not be disposed at the empty ports.

In certain examples, the cleaning structures are configured to inhibit gel (e.g., a thixotropic gel) disposed within the alignment device from exiting the alignment device. In an example, a cleaning structure can be configured to retain the gel within the alignment device while an optical fiber end face pierces the cleaning structure and enters the alignment device. In another example, a cleaning structure can be configured to retain the gel within the alignment device while an optical fiber end face is removed from the cleaning structure and from the alignment device.

In certain examples, the cleaning structures are configured to inhibit light emitted from an end face of an optical fiber from exiting a structure (e.g., an optical adapter) through an empty port. For example, a cleaning structure disposed at a first end of an alignment device may inhibit light from an optical fiber received at an opposite end of the alignment device from leaving the alignment device until another optical fiber is received at the first end.

In certain examples, the cleaning structures can include fiber cleaning sheets having self-healing characteristics. In certain examples, the cleaning structures are electrically charged. In an example, the cleaning structures can be electrically charged by mixing a solution to be electrospun with a surfactant salt, such as CETAB (cetyltrimethylammoniumbromide). In an example, the cleaning structures can be electrically charged by a surface modification technique, such as a plasma treatment. In certain examples, the cleaning structures include fabric or sheeting that includes electrospun fibers.

The term "optical fiber" as used herein relates to a single, optical transmission element having a core and a cladding. The core is the central, light-transmitting region of the fiber. The cladding is the material surrounding the core to form a guiding structure for light propagation within the core. In certain implementations, the core and cladding can be coated with a primary coating usually comprising one or more organic or polymer layers surrounding the cladding to provide mechanical and environmental protection to the light-transmitting region. In certain implementations, the core, cladding, and optional primary coating can be coated with a secondary coating, a so-called "buffer", which is a protective polymer layer without optical properties applied over the primary coating.

The core can have a diameter of about 200 nm to about 20 μm. In certain implementations, the core can have a diameter of about 5-10 μm. In certain implementations, the core can have a diameter of about 8-12 μm. In certain implementations, the cladding can have a diameter of about 120-130 μm. The primary coating may have a diameter ranging e.g. between 200 and 300 μm. The buffer or secondary coating usually has a diameter ranging between 300-1100 μm, depending on the cable manufacturer.

The term "light" as used herein relates to electromagnetic radiation, which comprises a part of the electromagnetic spectrum that is classified by wavelength into infrared, the visible region, and ultraviolet.

Index matching gel can be used with alignment devices in accordance with the principles of the present disclosure to improve the optical connection between the open light transmission paths of the first and second optical fibers. The index matching gel preferably has an index of refraction that closely approximates that of an optical fiber is used to reduce Fresnel reflection at the surface of the bare optical fiber ends. Without the use of an index-matching material, Fresnel reflections will occur at the smooth end faces of a fiber and reduce the efficiency of the optical connection and thus of the entire optical circuit.

BRIEF DESCRIPTION OF THE DRAWINGS

FIGS. 4-6 are exploded views of the optical fiber alignment device of FIG. 1;

FIG. 7 is a cross-sectional view taken along section line 7-7 of FIG. 2;

FIG. 15 is a top view of the duplex fiber optic adapter of FIG. 13;

FIG. 16 is a cross-sectional view taken along section line 16-16 of FIG. 15;

FIGS. 17 and 18 show a simplex fiber optic adapter in which one of the optical fiber alignment devices of FIG. 1 has been incorporated;

FIG. 20 illustrates a fiber optic connector in a non-connected state;

FIG. 21 illustrates the fiber optic connector of FIG. 20 in a connected state;

FIG. 31 is a top view of the duplex fiber optic adapter of FIG. 13;

FIG. 32 is a cross-sectional view taken along section line 32-32 of FIG. 31;

DETAILED DESCRIPTION

Figure 1:
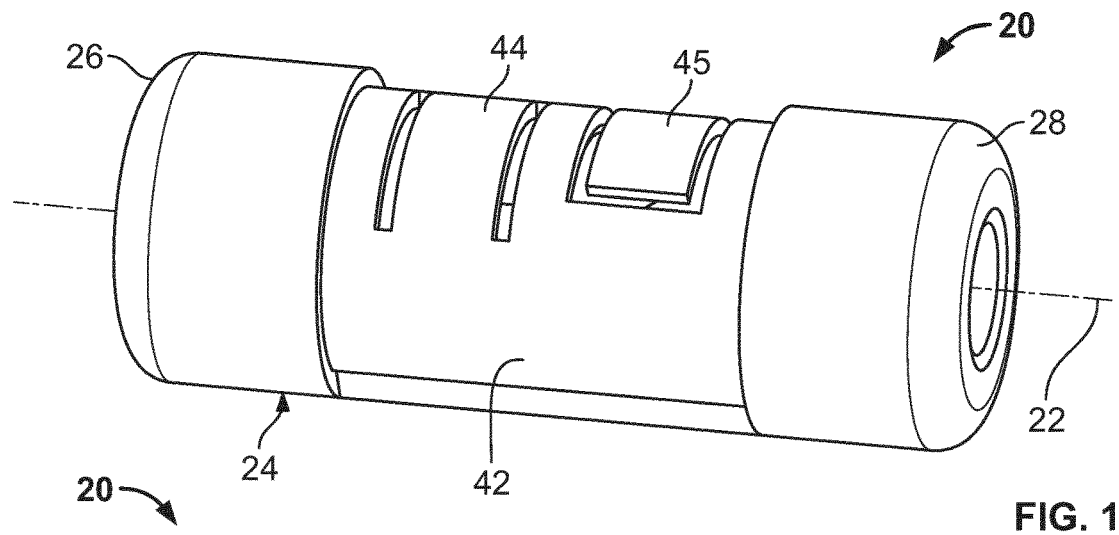
FIG. 1 is a perspective view of an optical fiber alignment device in accordance with the principles of the present disclosure.
Figure 2:
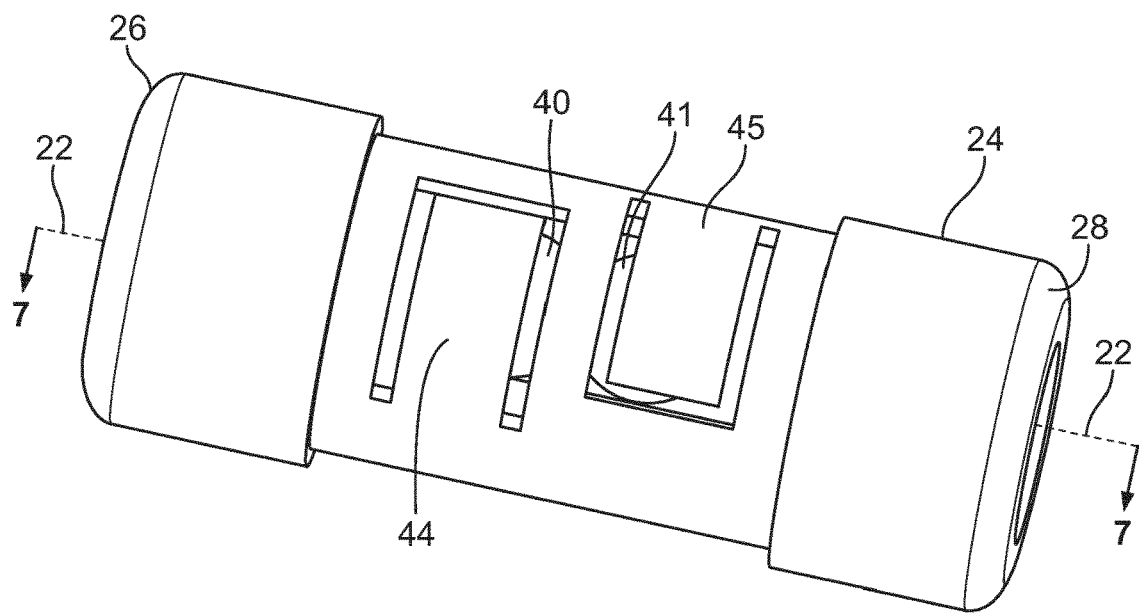
FIG. 2 is another perspective view of the optical fiber alignment device of FIG. 1.
Figure 3:
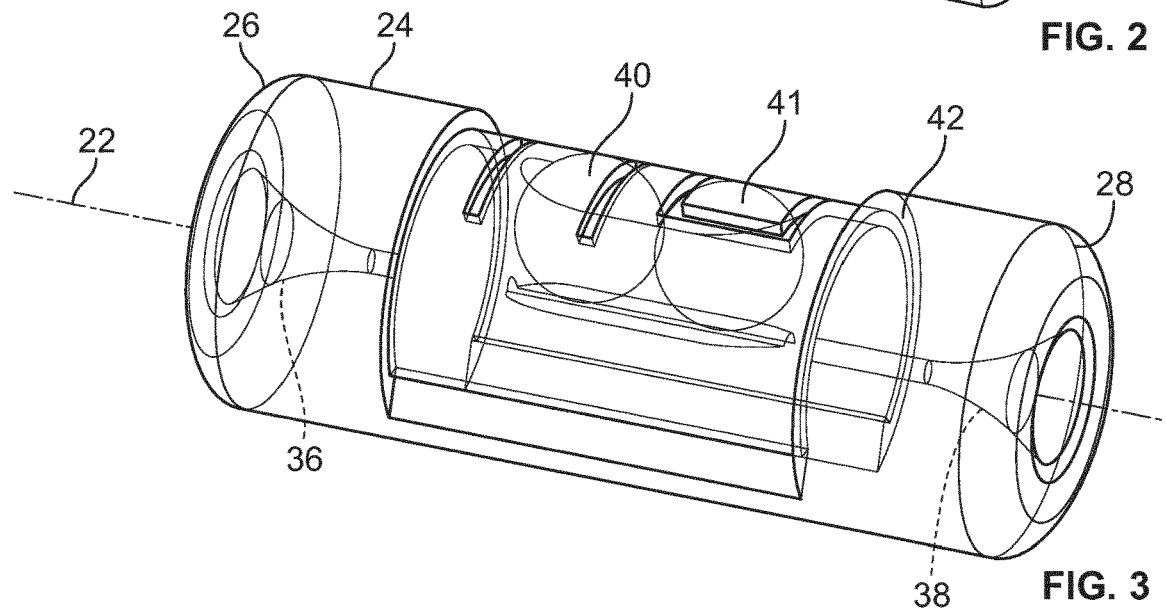
FIG. 3 is a further perspective view of the optical fiber alignment device of FIG. 1.
Figure 4:
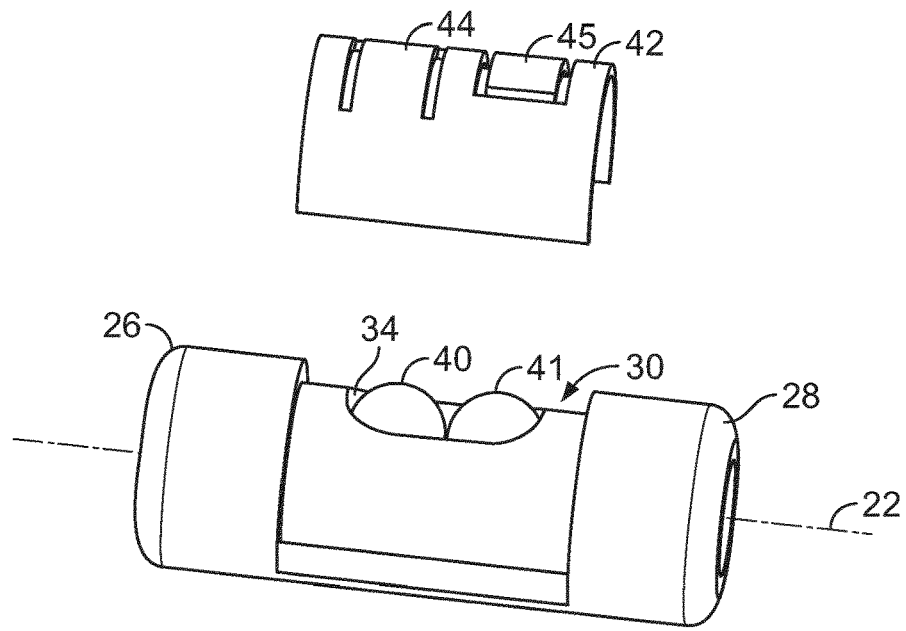
Figure 5:
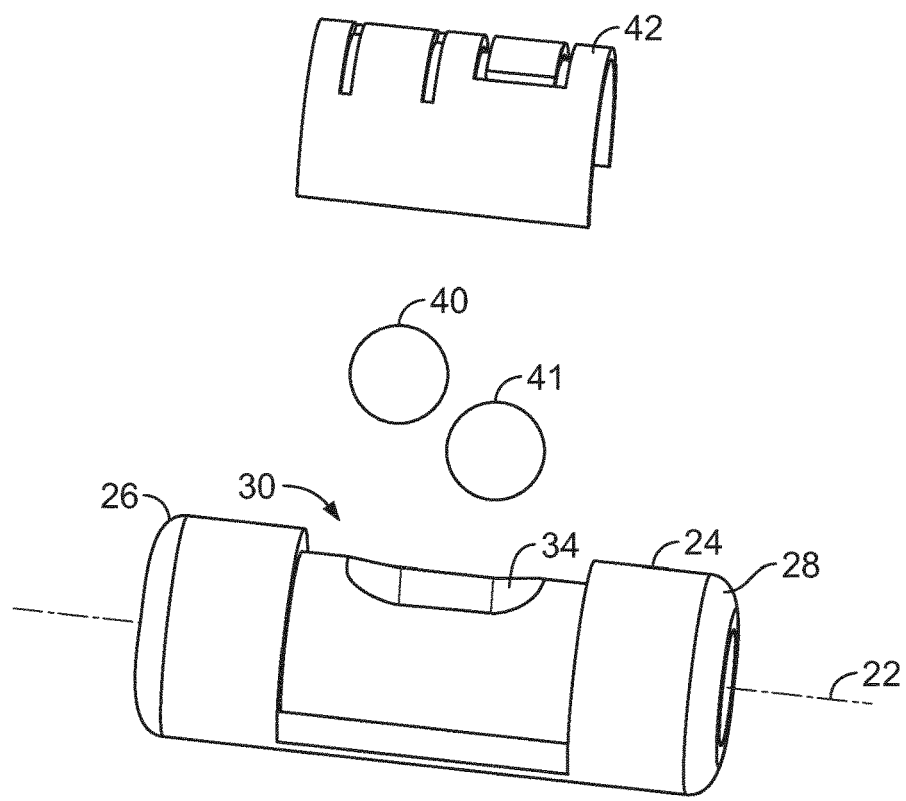
Figure 8:
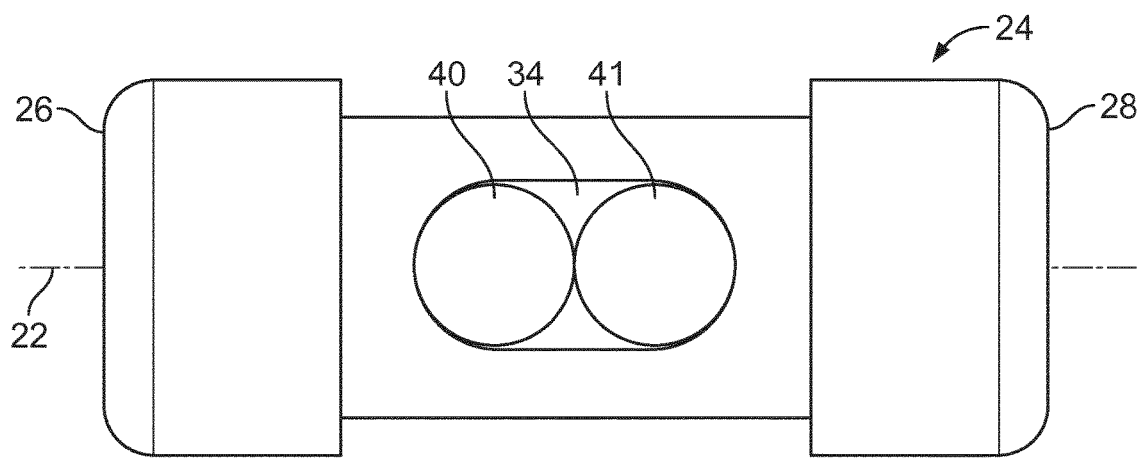
FIG. 8 is a top view of the optical fiber alignment device of FIG. 1 with a clip of the optical fiber alignment device removed.

FIGS. 1-10 illustrate an optical fiber alignment device 20 in accordance with the principles of the present disclosure. The optical fiber alignment device 20 is used to coaxially align and optically connect together two optical fibers such that optical transmissions can be conveyed from optical fiber to optical fiber. When first and second optical fibers are inserted into opposite ends of the optical fiber alignment device 20 along a fiber insertion axis 22, the optical fibers are guided to an orientation in which the optical fibers are coaxially aligned with one another with end faces of the optical fibers abutting or in close proximity to one another. A mechanism can be provided within the optical fiber alignment device 20 for mechanically retaining the optical fibers in an optically connected orientation. Thus, the optical fiber alignment device 20 functions to provide a mechanical splice between the optical fibers inserted therein. In certain embodiments, an index matching gel can be provided within the optical fiber alignment device 20 for enhancing the optical coupling between the aligned optical fibers retained within the optical fiber device 20. The optical fiber alignment device 20 can also include structure for cleaning the optical fibers as part of the insertion process. Thus, the optical fibers can be cleaned as part of the alignment process so as to be clean upon full alignment and optical coupling of the optical fibers.

Referring to FIGS. 1-10, the optical fiber alignment device 20 includes an alignment housing 24 (e.g., a molded plastic housing) including first and second ends 26, 28. The alignment housing 24 defines a fiber insertion axis 22 that extends through the alignment housing 24 between the first and second ends 26, 28. As shown at FIG. 7, the alignment housing 24 includes a fiber alignment region 30 at an intermediate location between the first and second ends 26, 28. The fiber alignment region 30 includes an alignment groove 32 that extends along the fiber insertion axis 22. The alignment housing 24 also defines a pocket 34 at the fiber alignment region 30 adjacent to the alignment groove 32. The first end of the alignment housing 26 includes a first funnel 36 that extends along the fiber insertion axis 22 for guiding a first optical fiber (e.g., see the left optical fiber 100 at FIG. 19) into the fiber alignment region 30. The second end 28 of the alignment housing 24 includes a second funnel 38 that extends along the fiber insertion axis 22 for guiding a second optical fiber (e.g., see the right optical fiber 100 at FIG. 19) into the fiber alignment region 30. The first and second funnels 36, 38 are configured to taper inwardly toward the fiber insertion axis 22 as the first and second funnels 36, 38 extend into the alignment housing 24 toward the fiber alignment region 30. The tapered configuration of the funnels 36, 38 functions to guide the first and second optical fibers into coaxial alignment with the fiber insertion axis 22 such that the optical fibers can be easily slid into registration with the alignment groove 32.

Figure 9:
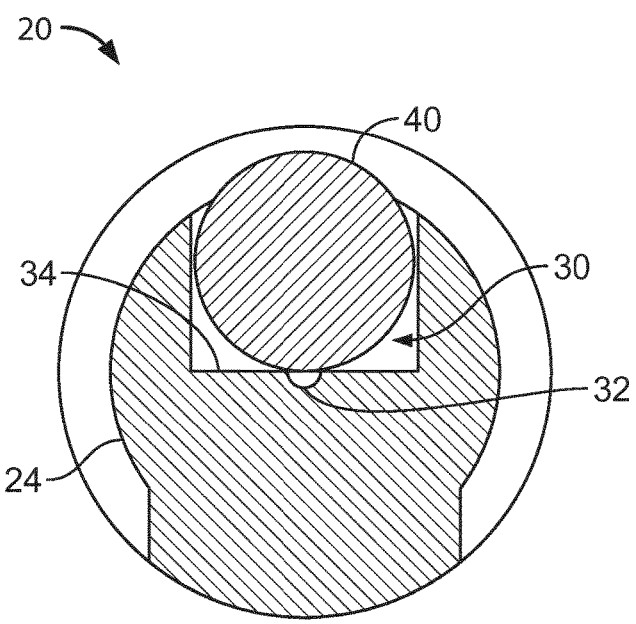
FIG. 9 is a cross-sectional view taken along section line 9-9 of FIG. 7 with the clip removed.
Figure 10:
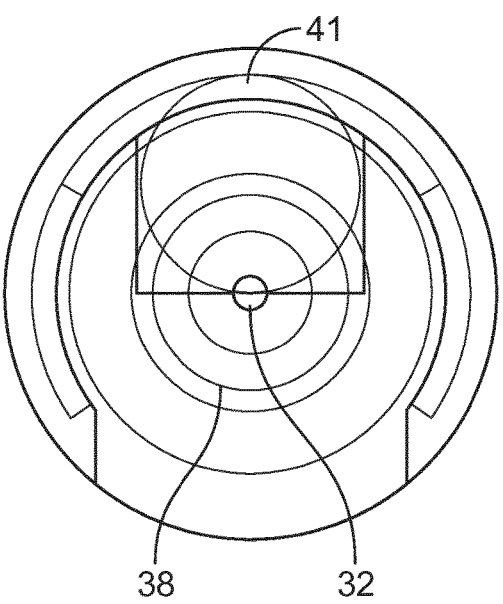
FIG. 10 is an end view of the optical fiber alignment device of FIG. 1.

When the first and second optical fibers are inserted into the alignment housing 24 along the fiber insertion axis 22, alignment between the optical fibers is provided by the alignment groove 32. In certain embodiments, the alignment groove 32 can have a curved transverse cross-sectional shape (e.g., a semi-circular transverse cross-sectional shape as shown at FIG. 9) and can be configured to receive the optical fibers therein such that the optical fibers seat within the alignment groove 32. In such an embodiment, it will be appreciated that the transverse cross-sectional shape of the alignment groove 32 complements the outer diameters of the optical fibers. In alternative embodiments, the alignment groove can have a transverse cross-sectional shape that is generally v-shaped (i.e., the alignment groove 32 can be a V-groove). In such an embodiment, the V-groove provides two lines of contact with each of the optical fibers inserted therein. In this way, the line/point contact with the V-groove assists in providing accurate alignment of the optical fibers.

It will be appreciated that the optical fibers inserted within the optical fiber alignment device 20 are preferably preprocessed. For example, in certain embodiments, coatings of the optical fibers can be stripped from end portions of the optical fiber such that bare glass portions of the optical fibers are inserted within the fiber alignment region 30. In such embodiments, the alignment groove 32 is configured to receive the bare glass portions of the optical fibers. In one embodiment, the bare glass portions can have diameters ranging from 120-130 microns and can be formed by glass cladding layers that surround glass cores.

The optical fiber alignment device can also include cleaning structures for cleaning ferrule-less free end portions 100' of the optical fibers 100 during the alignment process. In one example, optical fiber cleaning layers 500 (e.g., sheets, fabric layers, electrically charged layers, layers formed by electrospun fibers, self-healing layers, etc.) are positioned adjacent the ends 26, 28 of the alignment housing. In one example, the optical fiber cleaning layers 500 are secured at major diameters of the funnels 36, 38 by caps 502 mounted on the ends 26, 28 of the alignment housing 24. In another example, the optical fiber cleaning layers 500 are secured adjacent minor diameters of the funnels 36, 38. During the fiber alignment process, the ferrule-less free end portions 100' desired to be coupled together pass through (i.e., penetrate, pierce, etc.) the optical fiber cleaning layers 500 as the ferrule-less free end portions 100' are inserted along the insertion axis 22. In this way, end faces of the ferrule-less free end portions 100' are cleaned prior to be clamped within the alignment groove 32 to achieve co-axial alignment and optical coupling of the optical fibers 100.

In one embodiment, the optical fiber cleaning layers 500 may include an electrospun material. Electrospinning is a process well known in the art that generally creates nanofibers through an electrically charged jet of polymer solution or polymer melt. The process of electrospinning results in the production of continuous fibers deposited as a non-woven fibrous mat or membrane by the application of an electric force. When the polymer concentration is high, fibers can form from the utilization of chain entanglement in polymer solutions or melts. In other words, electrospinning allows the fabrication of nanofibers from mixtures or solutions, which have great potential for fabrication of non-woven fiber mats. The materials to be electrospun will depend on the application.

In some implementations, the cleaning layers 500 are electrospun onto the ends 26, 28 of the alignment housing 24 while the alignment housing 24 is disposed within an adapter (e.g., adapters 60, 64, 66 of FIGS. 13-19), a connector (e.g., connector 50 of FIGS. 11-12), or other device. In certain implementations, the electrospinning process occurs close to the ends 26, 28 so that bending instabilities in the jet still have low amplitude. In certain implementations, a focusing electrode (e.g., a conductive ring) at the jet can be used to further decrease jet oscillations and focus the deposition of the fibers to the ends 26, 28 of the alignment device 20. For example, the focusing electrode may be maintained at a desired potential (e.g., a lower potential than the nozzle and a higher potential than a surface on which the fibers are spun) and tuned according to the flow of the fibers.

The electrospun material may include nanofibers that have a diameter of between about 1-10 μm. In some implementations, the electrospun material may include polyurethane (PU). In certain implementations, the electrospun material may include a thermoplastic PU. In an example, the electrospun material includes a pure PU. In certain implementations, the electrospun material includes PU blended with Polyethylene terephthalate (PET). In an example, the electrospun material includes a blend of PU and a low amount of PET (e.g., PU:PET 3:1, PU:PET 6:1, etc.). In one embodiment, the electrospun material may be a contamination trapping barrier of nanofibers that have charged ions configured for cleaning surfaces of optical fibers.

In other implementations, the electrospun material may include Polycaprolactone (PCL) solution. PCL is a semi-crystalline aliphatic polymer that can have a low glass transition temperature at −60° C., a melting temperature at about 60° C. In other examples, poly-L-lactide (PLLA) solution may be used to form the electrospun material. Due to the chiral nature of lactic acid, several distinct forms of polylactide exist (i.e., poly-L-lactide (PLLA) is the product resulting from polymerization of L,L-lactide (also known as L-lactide)). PLLA can have a crystallinity of about 37%, a glass transition temperature between about 55-65° C., a melting temperature between about 170-183° C. and a tensile modulus between about 2.7-16 GPa. PLLA can be quite stable under everyday conditions, although it may degrade slowly in humid environments at temperatures above its glass transition temperature. In still other examples, the electrospun material may include a mixture of both PCL and PLLA. In still other implementations, other polymers may be used, such as, but not limited to, poly (ethylene oxide) (PEO), or a mixture thereof with PU and/or PET.

In other implementations, other polymers can be used to form electrospun fibers. For example, in various other implementations, the electrospun fibers can be formed of Nylon 6,6, Polycarbonate, Polyacrylonitrile (PAN), Polystyrene, PMMA, Polyvinylidene fluoride (PVDF), PE, HDPE, Isotactic PP, Nylon12, Polyethylene naphthalate (PEN), and blends or mixtures of the same.

In this example, the electrospun material incorporates positive surface charges for electrostatic interaction with negatively charged dust particles to clean an optical fiber. The thickness and/or density of the nanofibers in the electrospun material may determine the cleaning capability and puncturing force to push a fiber through a membrane of the electrospun material. It is to be understood that the fiber surface/density may vary between samples of the same polymer. In accordance with another aspect of the disclosure, the electrospun material may include apolar side chains on its surface for retaining oil micelles thereon.

In some implementations, the electrospun cleaning layers 500 are configured to have a puncturing force of no more than 0.25 N. In certain implementations, the electrospun cleaning layers 500 are configured to have a puncturing force of no more than 0.1 N. In certain implementations, the electrospun cleaning layers 500 are configured to have a puncturing force of no more than 0.08 N. In certain implementations, the electrospun cleaning layers 500 are configured to have a puncturing force of no more than 0.07 N. In certain implementations, the electrospun cleaning layers 500 are configured to have a puncturing force of no more than 0.06 N. In certain implementations, the electrospun cleaning layers 500 are configured to have a puncturing force of no more than 0.05 N.

In some implementations, the electrospun cleaning layers 500 can have a thickness of about 50 μm to about 500 μm. In certain implementations, the electrospun cleaning layers 500 can have a thickness of about 100 μm to about 400 μm. In certain implementations, the electrospun cleaning layers 500 can have a thickness of about 150 μm to about 300 μm. In an example, the electrospun cleaning layers 500 can have a thickness of about 200 μm.

The optical fiber alignment device 20 further includes structure for urging the optical fibers into contact with the fiber alignment groove 32. In the depicted embodiment, the fiber optic alignment device 20 includes first and second balls 40, 41 (i.e., fiber contact members) positioned within the pocket 34. The pocket 34 has an elongate direction that extends along the fiber insertion axis 22 and the pocket 34 functions to align the balls 40, 41 (e.g., spheres) along the fiber insertion axis 22. The optical fiber alignment device 20 further includes a biasing arrangement for urging the balls 40, 41 generally toward the alignment groove 30. For example, the biasing arrangement can urge the balls 40, 41 in a direction transverse with respect to the fiber insertion axis 22. In the depicted embodiment, the biasing arrangement is shown including a clip 42 (e.g., a metal clip having elastic properties) mounted (e.g., snap fitted) over the alignment housing 24 adjacent the fiber alignment region 30. The clip 42 has a transverse cross-sectional profile that is generally C-shaped. When the clip 42 is snapped over the alignment housing 24, the clip 42 functions to capture the balls 40, 41 within the pocket 34. The clip 42 includes biasing structures such as first and second springs 44, 45 for respectively biasing the balls 40, 41 toward the alignment groove 32. As depicted, the springs 44, 45 are leaf springs having a cantilevered configuration with a base end integrally formed with a main body of the clip 42 and free ends that are not connected to the main body of the clip 42. In the depicted embodiment, the first spring 44 extends (e.g., curves) from its base end to its free end in a generally clockwise direction around the axis 22 and the second spring 45 extends (e.g., curves) from its base end to its free end in a generally counterclockwise direction around the axis 22. The springs 44, 45 are defined by cutting or slitting the clip 42 so as to define slots in the clip 42 that surround three sides of each of the springs 44, 45.

In some implementations, a gel can be provided within the alignment device 20 (e.g., within the pocket 34 and/or the fiber alignment groove 32). In certain implementations, the gel facilitates alignment between optical fibers at the alignment device 20. In certain implementations, the gel can be a thixotropic gel. In certain implementations, the electrospun cleaning layers 500 can function as a scaffold to hold the gel within the alignment device 20. In an example, the electrospun cleaning layers 500 can retain the gel within the alignment device 20 during de-mating (e.g., unplugging) of an optical fiber from the alignment device 20.

Figure 11:
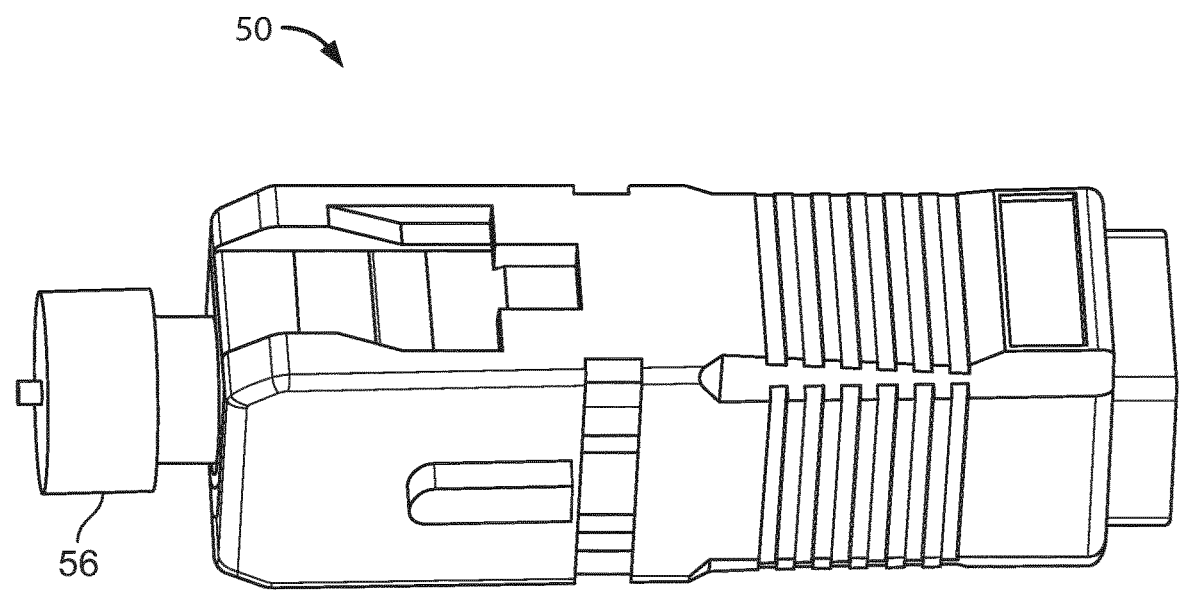
FIGS. 11 and 12 show a connector in which the optical fiber alignment device of FIG. 1 has been incorporated.
Figure 12:
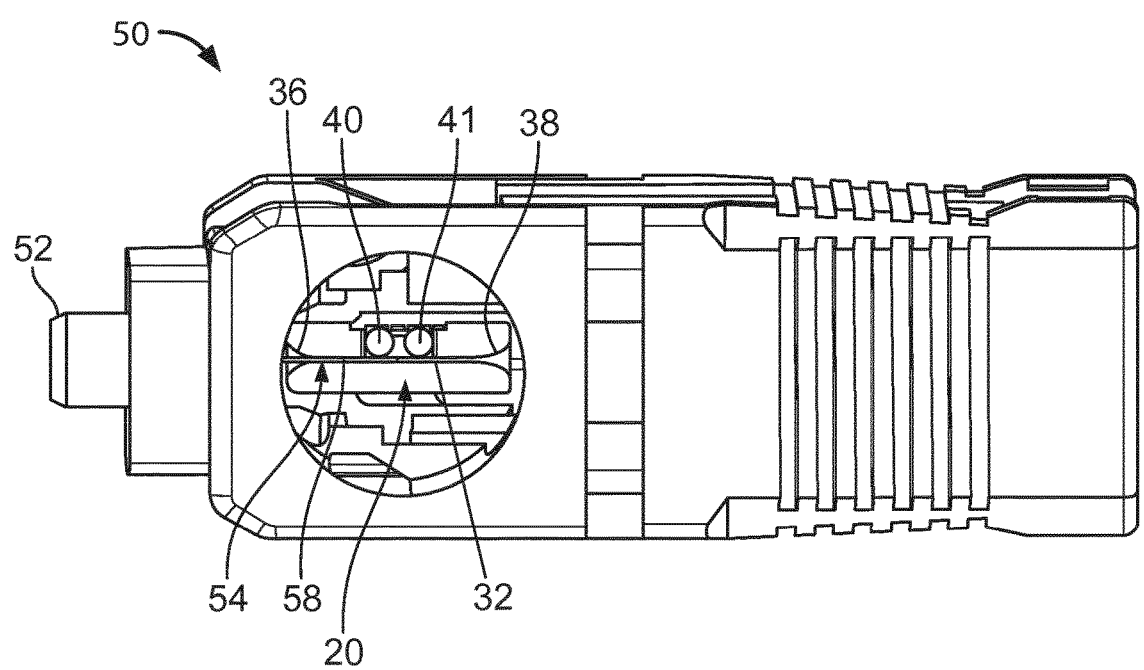
Figure 13:
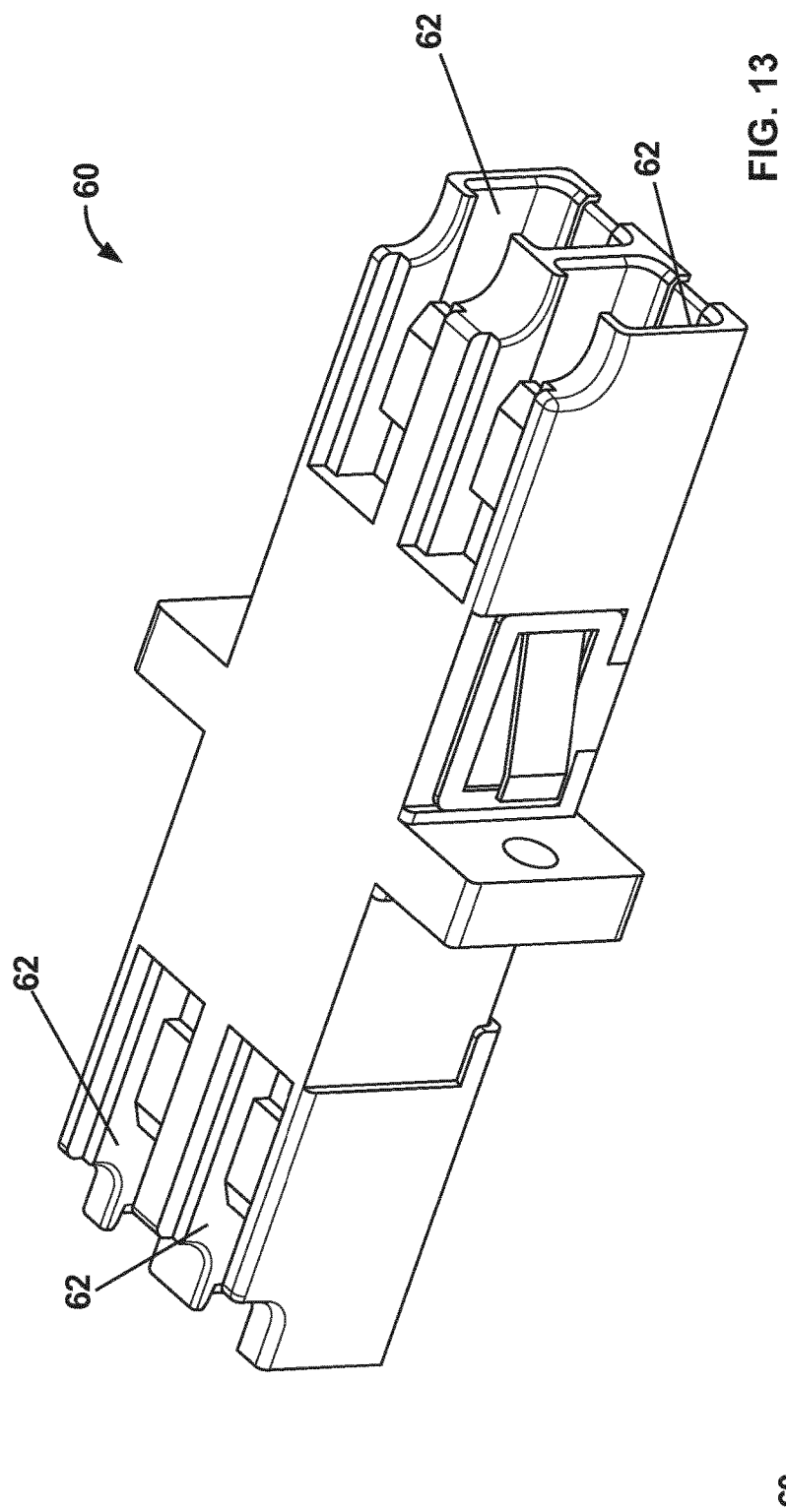
FIG. 13 is a perspective view of a duplex fiber optic adapter in which two optical fiber alignment devices of the type shown at FIG. 1 have been incorporated.
Figure 14:
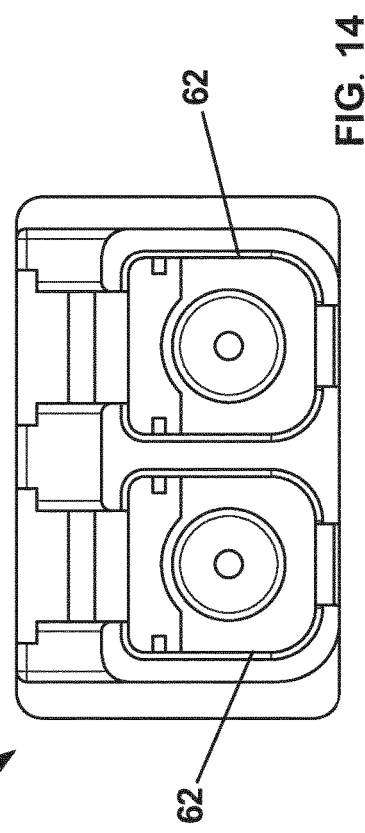
FIG. 14 is an end view of the duplex fiber optic adapter of FIG. 13.

FIGS. 11 and 12 show the optical fiber alignment device 20 incorporated into a fiber optic connector 50 such as an SC connector. The connector 50 includes a ferrule 52 supporting an optical fiber 54. A dust cap 56 can be mounted over the interface end of the ferrule 52. The optical fiber 54 includes a stub end 58 that projects rearwardly from the ferrule 52 into the body of the connector 50. The stub end 58 is inserted within the first funnel 36 of the optical fiber alignment device 20 and is shown pressed within the fiber alignment groove 32 by the first ball 40. In other implementations, the alignment device 20 can be integrally formed with the ferrule 52.

The connector 50 is optically connected to another fiber (i.e., a fiber to be terminated) by inserting the fiber to be terminated through the rear end of the connector 50 and into the second funnel 38. As the fiber to be terminated is inserted into the second funnel 38, the fiber to be terminated is guided into alignment with the fiber insertion axis 22. Continued insertion of the fiber to be terminated causes the fiber to register with the fiber alignment groove 32 and displace the second ball 41 against the bias of the corresponding second spring 45. In this way, the spring biased balls 40, 41 assist in retaining the optical fibers in alignment along the alignment groove 32. In one embodiment, the connector 50 can have mechanical field splice capabilities in which the connector can be field spliced to an optical fiber by inserting the optical fiber through the rear end of the connector 50 and into the fiber alignment device 20.

In some implementations, the fiber alignment device 20 includes one or more optical fiber cleaning membranes 500. For example, in some implementations, the fiber alignment device 20 has an optical fiber cleaning membrane 500 at the second funnel 38 and does not include an optical fiber cleaning membrane at the first funnel 36. In other implementations, the fiber alignment device 20 has an optical fiber cleaning membrane 500 at each funnel 36, 38. In some implementations, the fiber cleaning membrane 500 is spun onto the alignment device 20. In other implementations, the fiber cleaning membrane 500 is formed on a substrate, removed from the substrate, and fixed (e.g., mechanically attached, glued, or otherwise coupled) to the alignment device 20.

In some implementations, the optical fiber cleaning layer 500 functions to clean an optical fiber as the optical fiber is inserted into the fiber alignment device 20. In other implementations, the optical fiber cleaning layer 500 functions to inhibit contamination of an optical fiber after the optical fiber is cleaned and inserted into the fiber alignment device 20 (e.g., in a clean room or other sterile environment). In other implementations, the optical fiber cleaning layer 500 functions to inhibit damage to an optical fiber after the optical fiber is inserted into the fiber alignment device 20.

When the optical fiber is disconnected from the alignment device 20 (e.g., upon discontinuation of service to a particular subscriber), the cleaning layer 500 recovers its original shape. For example, the elasticity of the electrospun fibers may cause the fibers to recover their shape upon removal of the optical fiber from the cleaning layer 500. Accordingly, the cleaning layer 500 may be reused to clean and/or protect another optical fiber subsequently inserted into the fiber alignment device 20.

FIGS. 13-16 and 31-32 illustrate duplex fiber optic adapters 60 adapted for receiving and optically connecting two pairs of fiber optic connectors. In one embodiment, the connectors have an LP connector type profile/footprint. Two of the optical fiber alignment devices 20 are mounted within the duplex fiber optic adapter 60. In some implementations, the adapter 60 includes an alignment device holder 25. In certain implementations, the adapter 60 includes a front portion and a rear portion that each include a part 25*a*, 25*b* of an alignment device holder 25. The alignment device 20 can be disposed between (e.g., enclosed within) the parts 25*a*, 25*b* of the alignment device holder 25.

The cleaning layers 500 are disposed within the adapter 60 at the alignment device 20. When fiber optic connectors are inserted within coaxially aligned ports 62 of the fiber optic adapter 60, optical fibers of the fiber optic connectors enter the optical fiber alignment device 20 through optical fiber cleaning layers 500 and the first and second funnels 36, 40 and are mechanically spliced at the fiber alignment region 30. In the example shown in FIGS. 13-16, the cleaning layers 500 are disposed at an exterior of the alignment device holder 25. In some such implementations, the nozzle providing the electrospun fibers can be inserted into the adapter ports to spin the fibers onto the holder 25. In other such implementations, the cleaning layers 500 can be formed on a substrate and moved to the alignment device holder 25.

In the example shown in FIGS. 31 and 32, the cleaning layers 500 are disposed at an exterior of the alignment device 20 (e.g., as shown in FIG. 7). In some implementations, a two-part adapter 60 and/or two-part 25*a*, 25*b* alignment device holder 25 facilitates assembly of the adapter 60 with the cleaning layers 500. For example, in certain implementations, the nozzle providing the electrospun fibers is inserted into the holder parts 25*a*, 25*b* through openings at the seam 27 (FIG. 16), thereby reducing a distance over which the fibers travel between the nozzle and the surface on which they are spun.

In other implementations, the cleaning layers 500 can be formed on a substrate and moved into the alignment device holder 25 through the openings at the seam 27 before the alignment device 20 is disposed in the holder 25. In certain implementations, the cleaning layers 500 are clamped or otherwise held between the alignment device 20 and the alignment device holder 25. In certain implementations, the cleaning layers 500 are disposed within the holder 25, but glued or mechanically fastened to the alignment device 20.

FIGS. 17, 18, 33, and 34 show simplex fiber optic adapters 64, 66 having the same basic configuration as the duplex fiber optic adapter 60. Each adapter 64, 66 includes an alignment device holder 25. In the example shown in FIGS. 17-18, the cleaning layers 500 are disposed at an exterior of the alignment device holder 25. In the example shown in FIGS. 33-34, the cleaning layers 500 are disposed at an exterior of the alignment device 20 and within the holder 25.

The simplex fiber optic adapters 64, 66 are the same except the simplex adapter 66 is provided with shutters 68. The shutters 68 flex open when fiber optic connectors are inserted into corresponding ports of the adapter 66. When no connectors are inserted in the adapter 66, the shutter 68 inhibits dust or other contaminants from entering the fiber alignment device 20 within the interior of the adapter 66. The optical fiber cleaning layers 500 provide a second level of protection for preventing contaminants from entering the alignment device 20.

Figure 19:
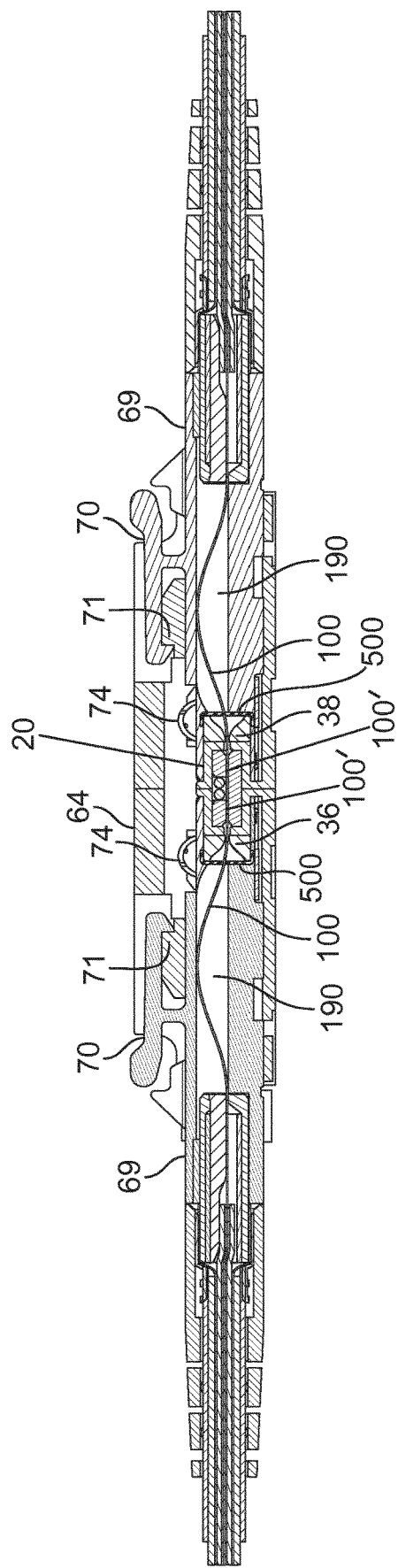
FIG. 19 shows the simplex fiber optic adapter of FIGS. 17 and 18 with fiber optic connectors inserted therein.
Figure 35:
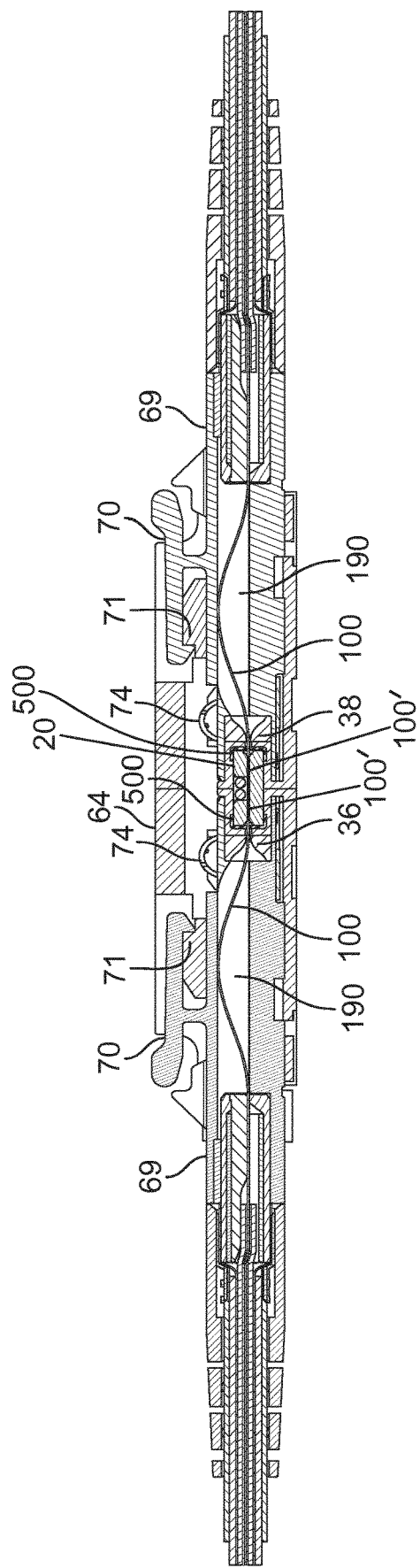
FIG. 35 shows the simplex fiber optic adapter of FIGS. 33 and 34 with fiber optic connectors inserted therein.

FIGS. 19 and 35 show the simplex fiber optic adapter 64 being used to optically and mechanically couple two fiber optic connectors 69. In the example shown in FIG. 19, the cleaning layers 500 are disposed at an exterior of the alignment device holder 25. In the example shown in FIG. 35, the cleaning layers 500 are disposed at an exterior of the alignment device 20 and within the holder 25.

In one example, the fiber optic connectors 69 can have an LP-connector type footprint/profile/shape. The fiber optic connectors 69 include latches 70 (e.g., resilient cantilever style latches) that engage catches 71 of the fiber optic adapter 64. When the fiber optic connectors 69 are inserted within coaxially aligned ports of the fiber optic adapter 64, shutters 74 (see FIG. 20) of the fiber optic connectors 69 are retracted (see FIG. 21) thereby exposing ferrule-less free ends 100' of the optical fibers 100 of the fiber optic connectors 69. Continued insertion of the fiber optic connectors 69 into the ports of the fiber optic adapter 64 causes the end portions 100' of the optical fibers 100 to enter the optical fiber alignment device 20 through cleaning layers 500 and the first and second funnels 36, 38. The optical fibers 100 slide along the insertion axis 22 and are brought into registration with the fiber alignment groove 30. As the optical fibers 100 move along the fiber alignment groove 30, the optical fibers 100 force their corresponding balls 40, 41 away from the alignment groove 32 against the bias of the springs 44, 45. The optical fibers 100 slide along the alignment groove 32 until end faces of the optical fibers 100 are optically coupled to one another. In this configuration, the springs 44, 45 and the balls 40, 41 function to clamp or otherwise retain the optical fibers 100 in the optically coupled orientation.

The embodiments disclosed herein can utilize a dimensionally recoverable article such as a heat-recoverable tube/sleeve for securing/locking optical fibers at desired locations within the connector bodies and for attaching cable jackets and cable strength members to the connectors. A dimensionally recoverable article is an article the dimensional configuration of which may be made substantially to change when subjected to treatment. Usually these articles recover towards an original shape from which they have previously been deformed, but the term "recoverable" as used herein, also includes an article which adopts a new configuration even if it has not been previously deformed.

A typical form of a dimensionally recoverable article is a heat-recoverable article, the dimensional configuration of which may be changed by subjecting the article to heat treatment. In their most common form, such articles comprise a heat-shrinkable sleeve made from a polymeric material exhibiting the property of elastic or plastic memory as described, for example, in U.S. Pat. No. 2,027,962 (Currie); U.S. Pat. No. 3,086,242 (Cook et al); and U.S. Pat. No.

3,597,372 (Cook), the disclosures of which are incorporated herein by reference. The polymeric material has been cross-linked during the production process so as to enhance the desired dimensional recovery. One method of producing a heat-recoverable article comprises shaping the polymeric material into the desired heat-stable form, subsequently crosslinking the polymeric material, heating the article to a temperature above the crystalline melting point (or, for amorphous materials the softening point of the polymer), deforming the article, and cooling the article while in the deformed state so that the deformed state of the article is retained. In use, because the deformed state of the article is heat-unstable, application of heat will cause the article to assume its original heat-stable shape.

In certain embodiments, the heat-recoverable article is a sleeve or a tube that can include a longitudinal seam or can be seamless. In certain embodiments, the tube has a dual wall construction including an outer, heat-recoverable annular layer, and an inner annular adhesive layer. In certain embodiments, the inner annular adhesive layer includes a hot-melt adhesive layer.

In one embodiment, the heat-recoverable tube is initially expanded from a normal, dimensionally stable diameter to a dimensionally heat unstable diameter that is larger than the normal diameter. The heat-recoverable tube is shape-set to the dimensionally heat unstable diameter. This typically occurs in a factory/manufacturing setting. The dimensionally heat unstable diameter is sized to allow the heat-recoverable tube to be inserted over two components desired to be coupled together. After insertion over the two components, the tube is heated thereby causing the tube to shrink back toward the normal diameter such that the tube radially compresses against the two components to secure the two components together. The adhesive layer is preferably heat activated during heating of the tube.

According to one embodiment, the heat-recoverable tube may be formed from RPPM material that deforms to a dimensionally heat stable diameter generally at around 80° C. RPPM is a flexible, heat-shrinkable dual wall tubing with an integrally bonded meltable adhesive liner manufactured by Raychem. According to another embodiment, the heat-recoverable tube 56 may be formed from HTAT material that deforms to a dimensionally heat stable diameter generally at around 110° C. HTAT is a semi-flexible, heat-shrinkable tubing with an integrally bonded meltable adhesive inner lining designed to provide moisture proof encapsulation for a range of substrates, at elevated temperatures. HTAT is manufactured by Raychem from radiation cross-linked polyolefins. The inner wall is designed to melt when heated and is forced into interstices by the shrinking of the outer wall, so that when cooled, the substrate is encapsulated by a protective, moisture proof barrier. According to one embodiment, the heat-recoverable tube may have a 4/1 shrink ratio between the dimensionally heat unstable diameter and the normal dimensionally heat stable diameter.

Referring again to FIGS. 20 and 21, the fiber optic connector 69 is part of a fiber optic assembly that includes a fiber optic cable 112 terminated to the fiber optic connector 69. The fiber optic cable 112 includes the optical fiber 100 and an outer jacket 116. In certain implementations, the fiber optic cable 112 includes a strength layer 118 positioned between the fiber 100 and the outer jacket 116. In certain implementations, the fiber optic cable 112 includes a buffer tube 117 (e.g., a buffer layer having an outer diameter ranging from 600-1000 microns (e.g., about 900 microns)) that surrounds the optical fiber 100. The optical fiber 100 can also include a coating layer 113 that surrounds a bare glass portion 111. In one example, the coating layer 113 can have an outer diameter ranging from 230-270 microns and the bare glass portion 111 can have a cladding layer having an outer diameter ranging from 120-130 microns and a core having a diameter ranging from 5-15 micron. In an example, the optical fiber 100 has a diameter of about 250 microns. Other examples can have different dimensions. The strength layer 118 can provide tensile reinforcement to the cable 112 and can include strength members such as reinforcing aramid yarns.

The fiber optic connector 69 includes a main connector body 122 having a front mating end 124 and a rear cable terminating end 126. An electrically conductive (e.g., metal) rear insert 130 is secured (e.g., press fit within) the rear cable terminating end 126 of the connector body 122. The optical fiber 100 extends from the fiber optic cable 112 forwardly through the main connector body 122 and has a ferrule-less end portion 100' that is accessible at the front mating end 124 of the connector body 122. Adjacent the rear cable terminating end 126 of the connector body 122, the optical fiber 100 is fixed/anchored against axial movement relative to the connector body 122. For example, the optical fiber 100 can be secured to a fiber securement substrate 119 by a shape recoverable article 121 (e.g., a heat shrink sleeve having an inner layer of hot melt adhesive). The fiber securement substrate 119 can be anchored within the rear insert 130. The rear insert 130 can be heated to transfer heat to the shape recoverable article thereby causing the shape recoverable article 121 to move from an expanded configuration to a fiber retaining configuration (e.g., a compressed configuration). The shape recoverable article 121 and the fiber securement substrate 119 function to anchor the optical fiber 10 against axial movement relative to the connector body 122. Thus, when an optical connection is being made, optical fiber cannot be pushed from inside the connector body 122 back into the fiber optic cable 112.

A fiber buckling region 190 (i.e., a fiber take-up region) is defined within the connector body 122 between the fiber anchoring location at the rear of the connector body 122 and the front mating end 124 of the connector body 122. When two connectors 69 are coupled together within one of the adapters 64 (as shown at FIG. 19), the end faces of the ferrule-less end portions 100' of the optical fibers 100 abut one another thereby causing the optical fibers 100 to be forced rearwardly into the connector bodies 122. As the optical fibers 100 are forced rearwardly into the connector bodies 122, the optical fibers 100 buckle/bend within the fiber buckling regions 190 (see FIGS. 19, 21 and 32) since the fiber anchoring location prevents the optical fiber 100 from being pushed back into the optical cable 112. The fiber buckling regions 190 are designed so that minimum bend radius requirements of the optical fibers 100 are not violated. In one example, the fiber buckling regions are sized to accommodate at least 0.5 millimeters or at least 1.0 millimeters of rearward axial movement of the optical fibers 100, 102. In one embodiment, the fiber buckling regions 190 have lengths from 15-25 millimeters. Fiber alignment structures 189 can be provided at the front mating ends 124 of the connectors 69 for providing rough alignment of the ferrule-less end portions 100' along insertion axes of the connectors 69. In this way, the ferrule-less end portions 100' are positioned to slide into the first and second funnels 36, 38 of the alignment device 20 when the connectors 69 are inserted into a fiber optic adapter such as one of the adapters 60, 64 or 66.

Referring still to FIGS. 20 and 21, the fiber securement substrate 119 can be loaded into the rear insert 130 through a front end of the rear insert 130. A front retention structure 123 (e.g., a flange, lip, tab or other structure) of the fiber securement substrate 119 can abut, mate with, interlock with or otherwise engage a front end of the insert 130. The rear insert 130 can be press fit within the rear end of the connector body. As used herein, the front end of the connector is the mating end where the ferrule-less end portion 100' is accessible, and the rear end of the connector is the end where the cable is attached to the connector body.

Figure 22:
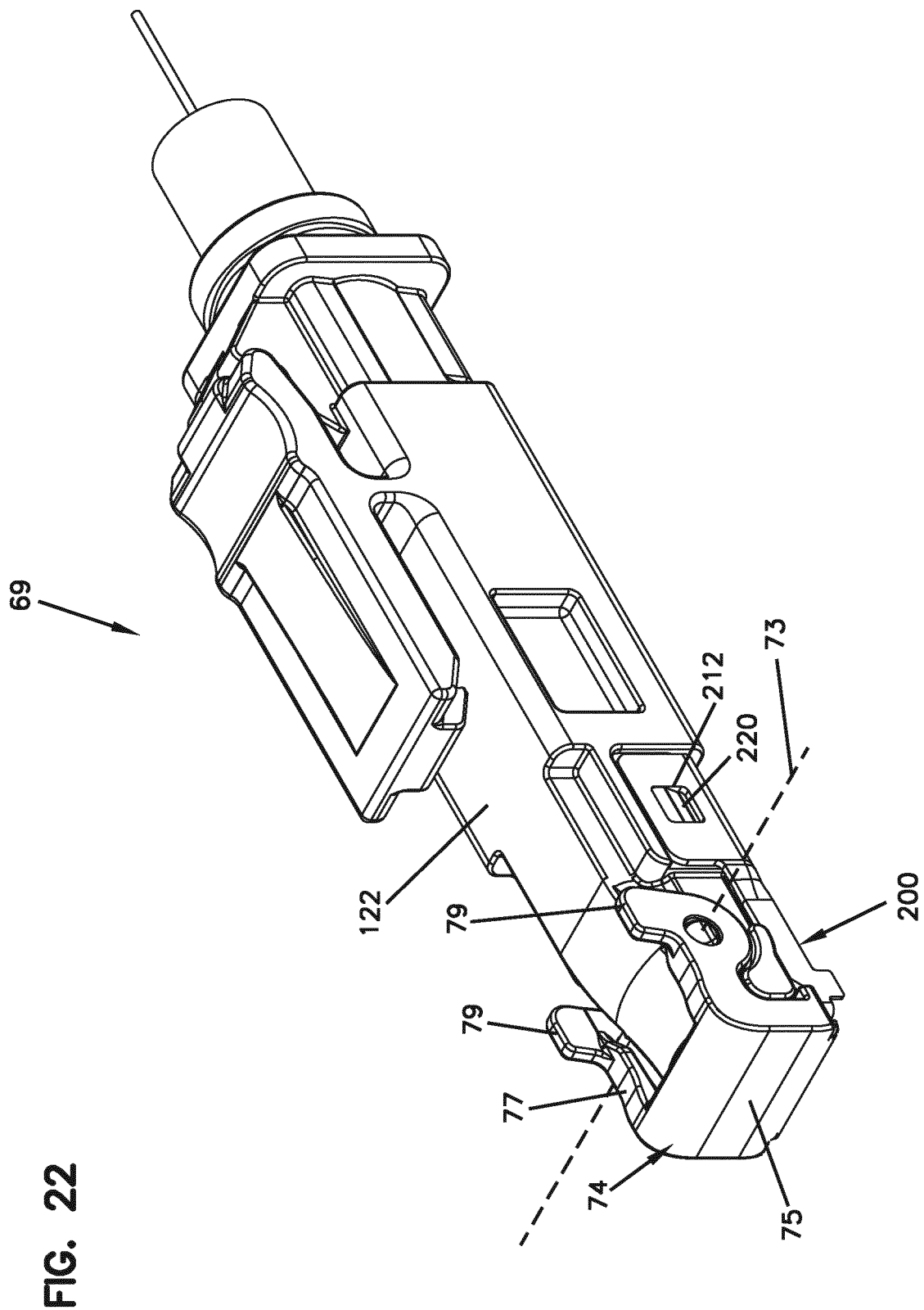
FIG. 22 is a front, top, perspective view of the fiber optic connector of FIG. 20 with a shutter of the fiber optic connector in a closed position.
Figure 23:
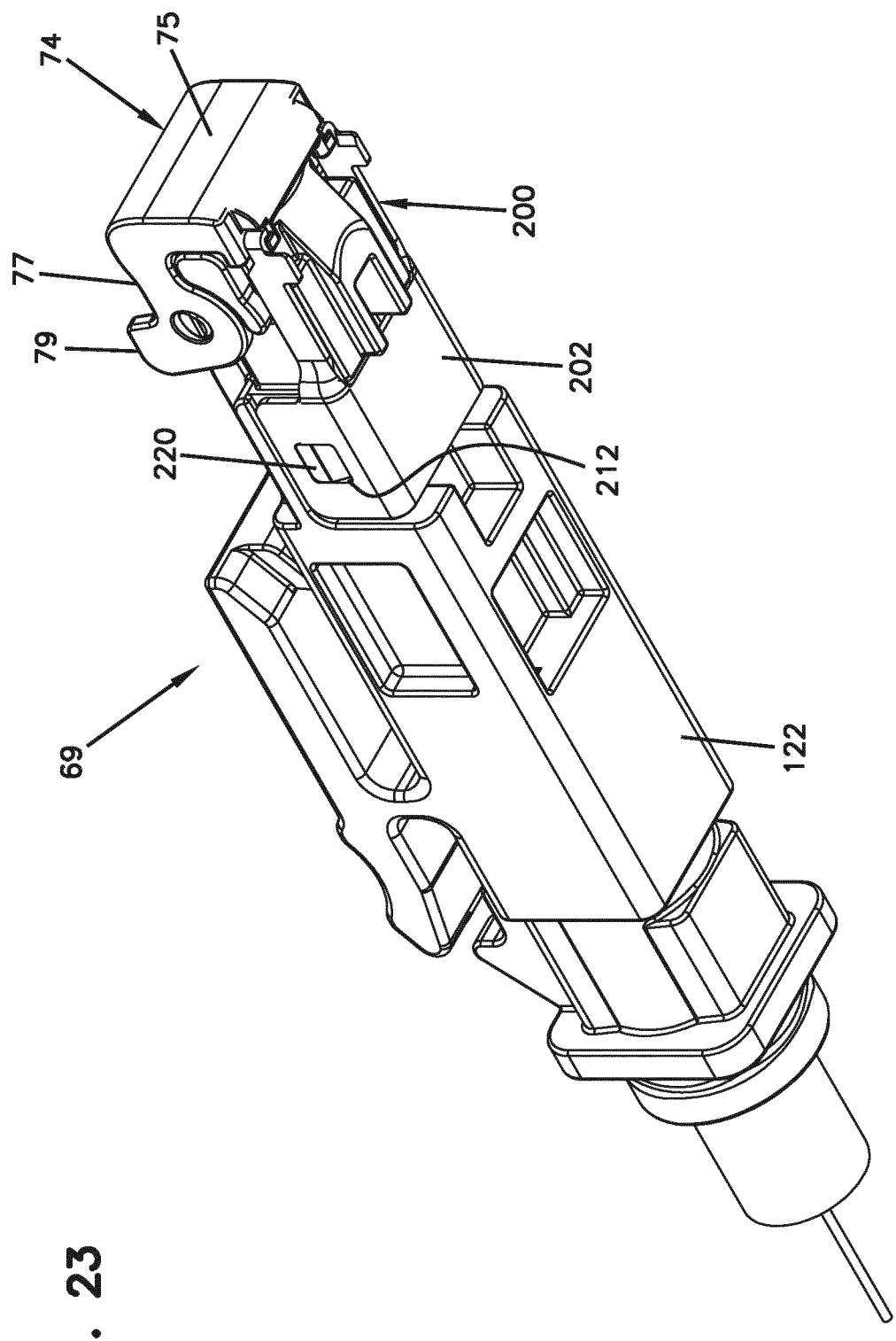
FIG. 23 is a front, bottom, perspective view of the fiber optic connector of FIG. 22 with the shutter in the closed position.
Figure 24:
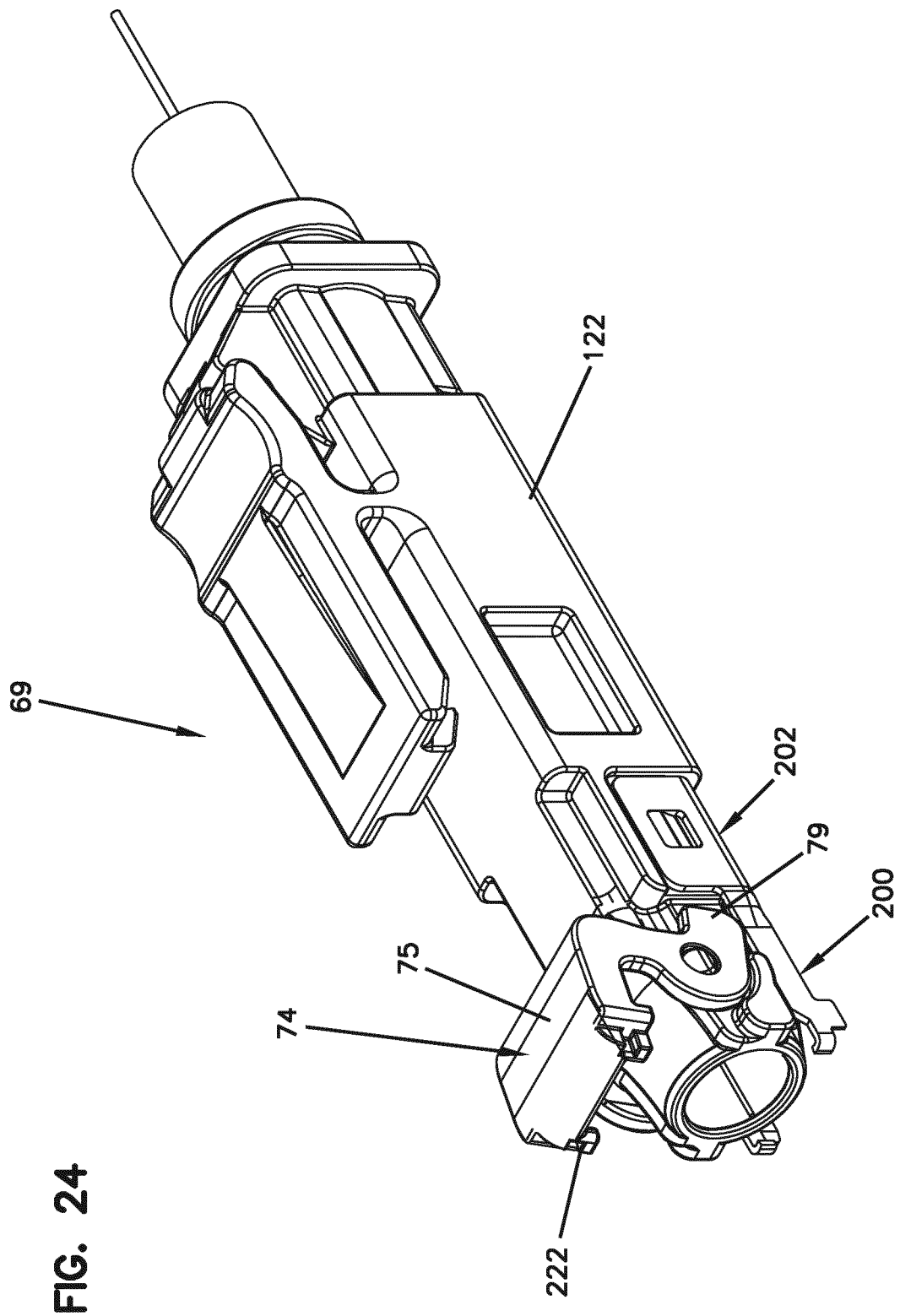
FIG. 24 is a front, top, perspective view of the fiber optic connector of FIG. 20 with a shutter of the fiber optic connector in an open position.
Figure 25:
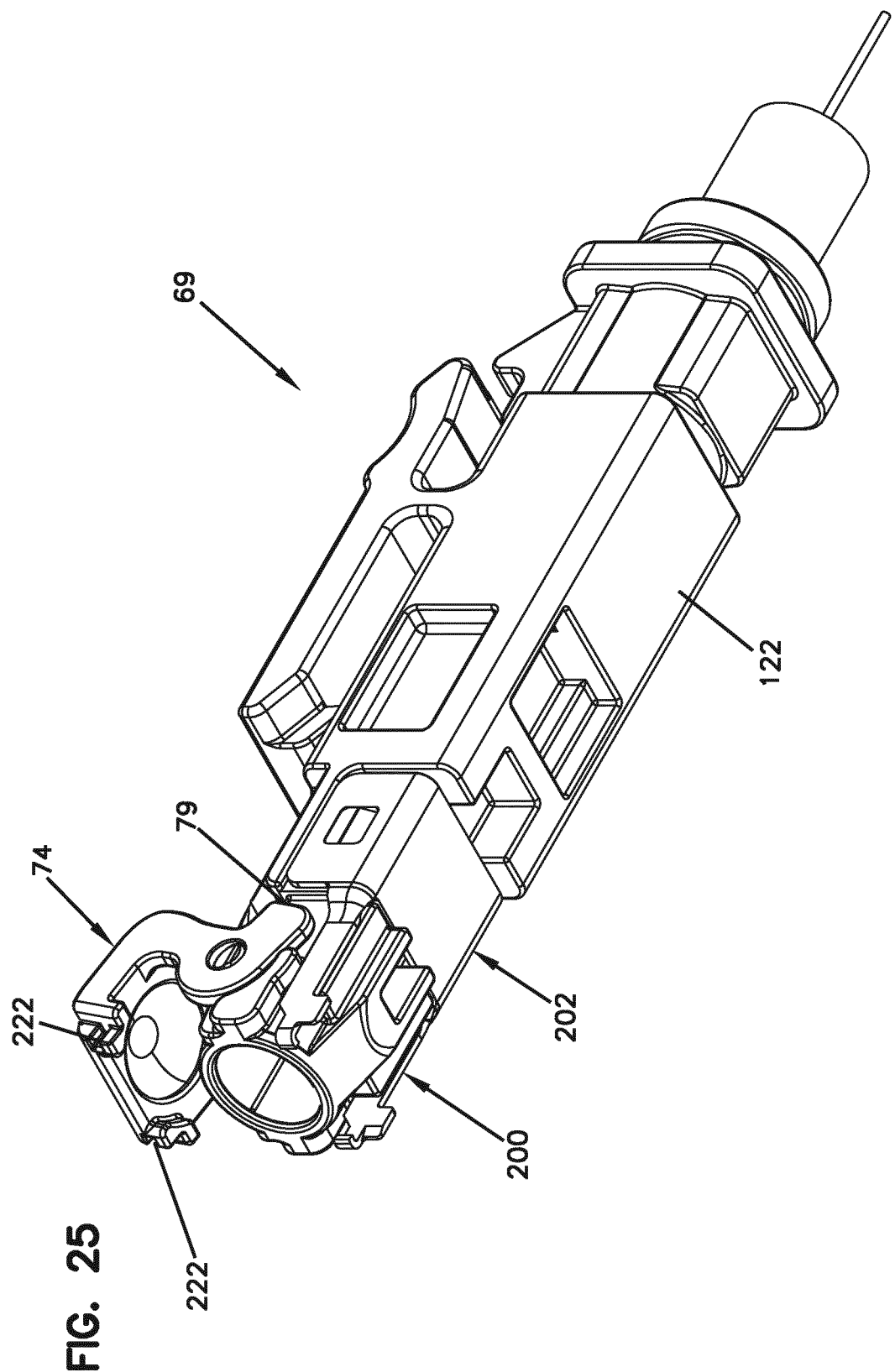
FIG. 25 is a front, bottom, perspective view of the fiber optic connector of FIG. 22 with the shutter in the open position.

The shutter 74 of the fiber optic connector 69 is movable between a closed position (see FIGS. 22 and 23) and an open position (see FIGS. 24 and 25). When the shutter 74 is in the closed position, the ferrule-less end portion 100' of the optical fibers 100 is protected from contamination. When the shutter 74 is in the open position, the ferrule-less end portion 100' is exposed and capable of being accessed for making an optical connection. The shutter 74 includes a front cover portion 75, a top portion 77 and a lever portion 79 that projects upwardly from the top portion 77. The shutter 74 pivots between the open and closed positions about a pivot axis 73.

Figure 26:
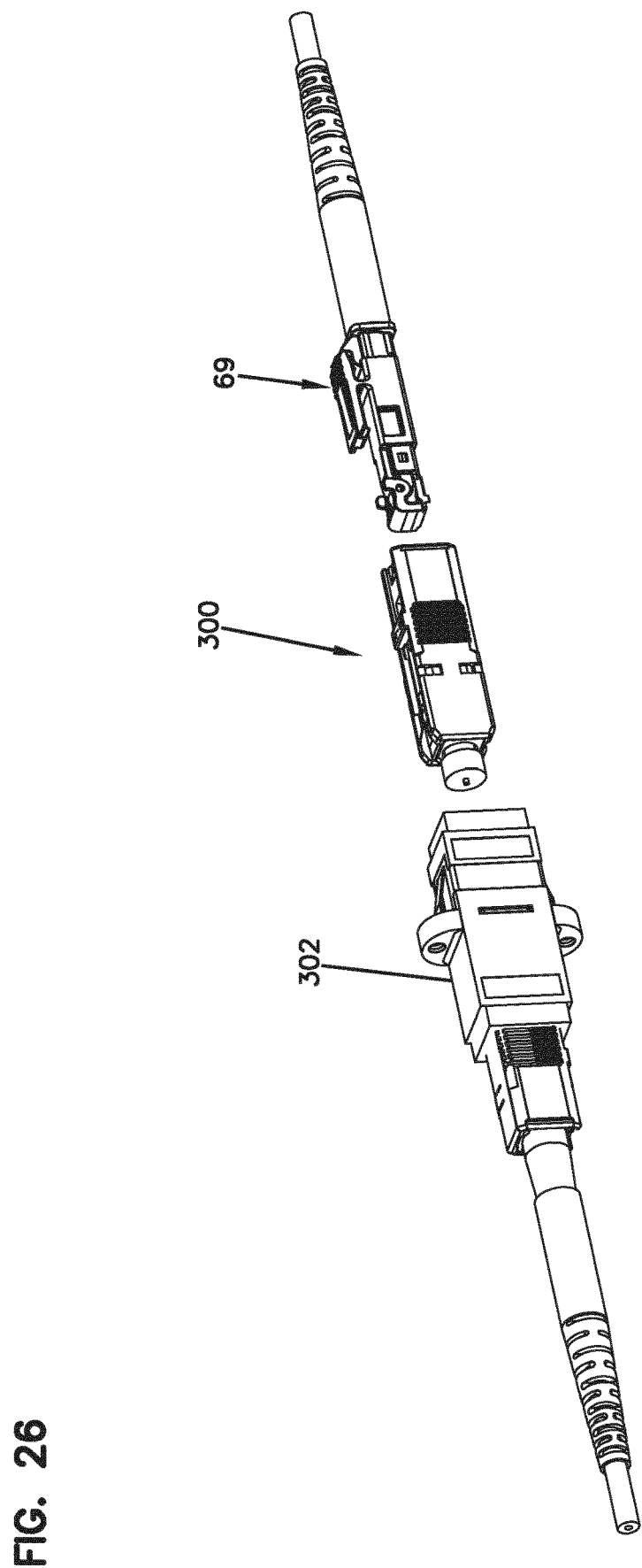
FIG. 26 is an exploded view showing a fiber optic adapter and a converter for converting the fiber optic connector of FIG. 20 to a ferruled fiber optic connector.
Figure 27:
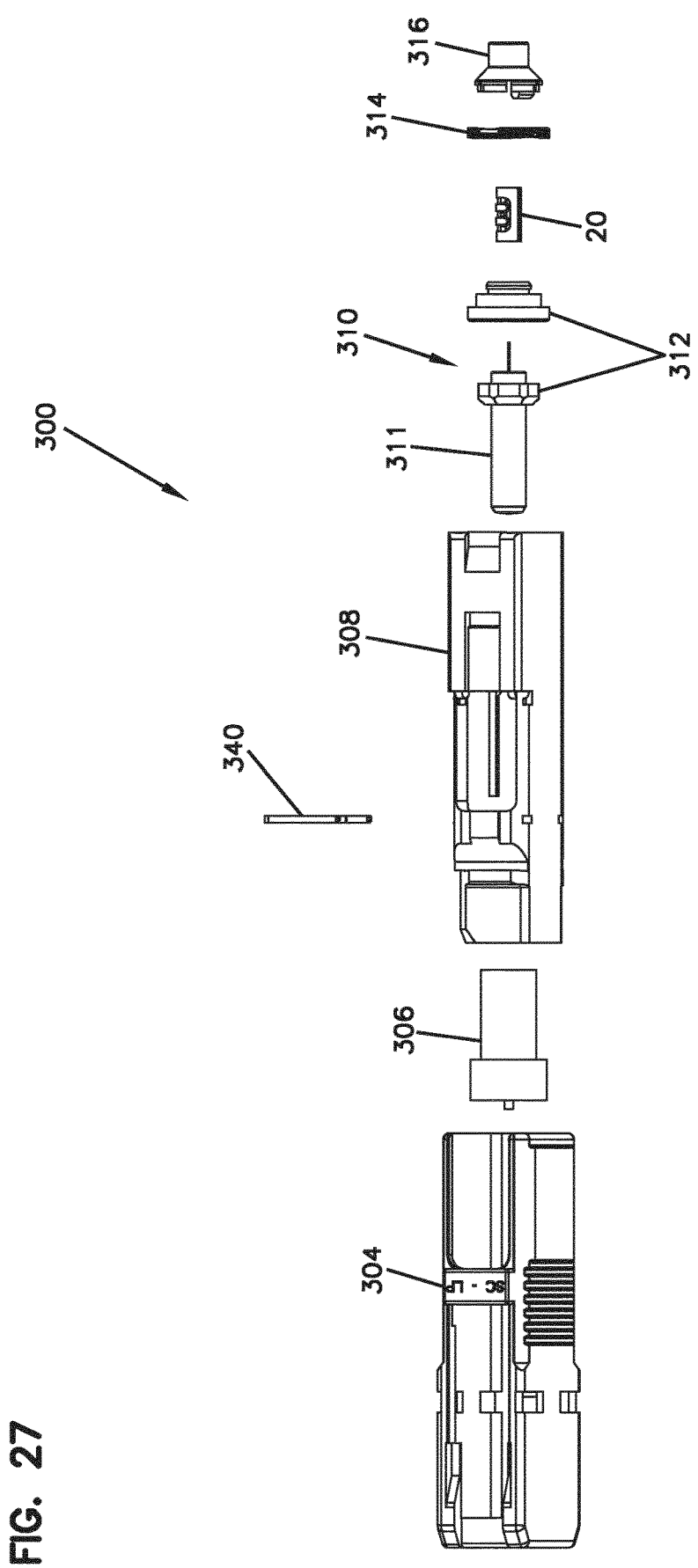
FIG. 27 is an exploded view of the converter of FIG. 26.
Figure 28:
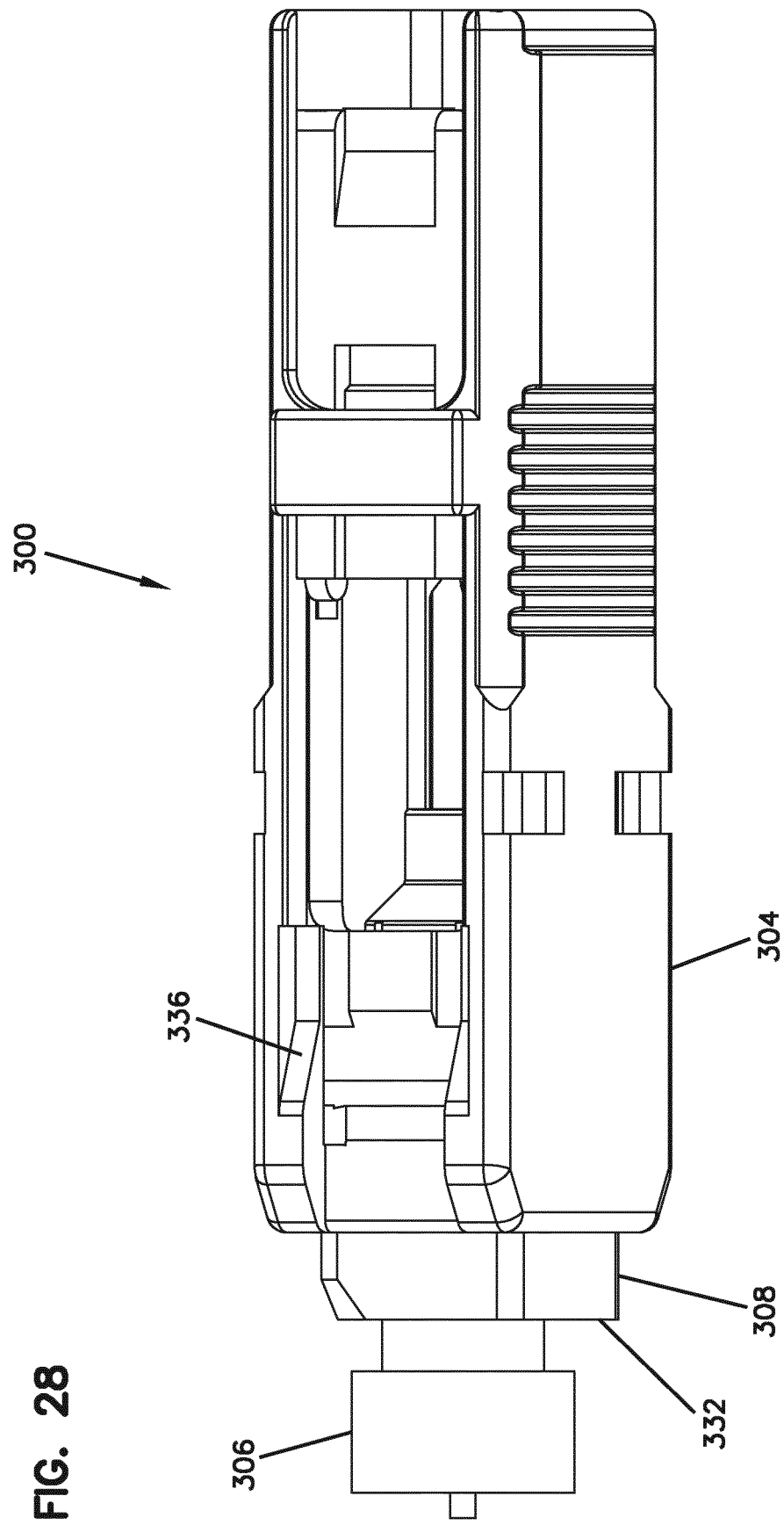
FIG. 28 is an assembled view of the converter of FIG. 27.
Figure 29:
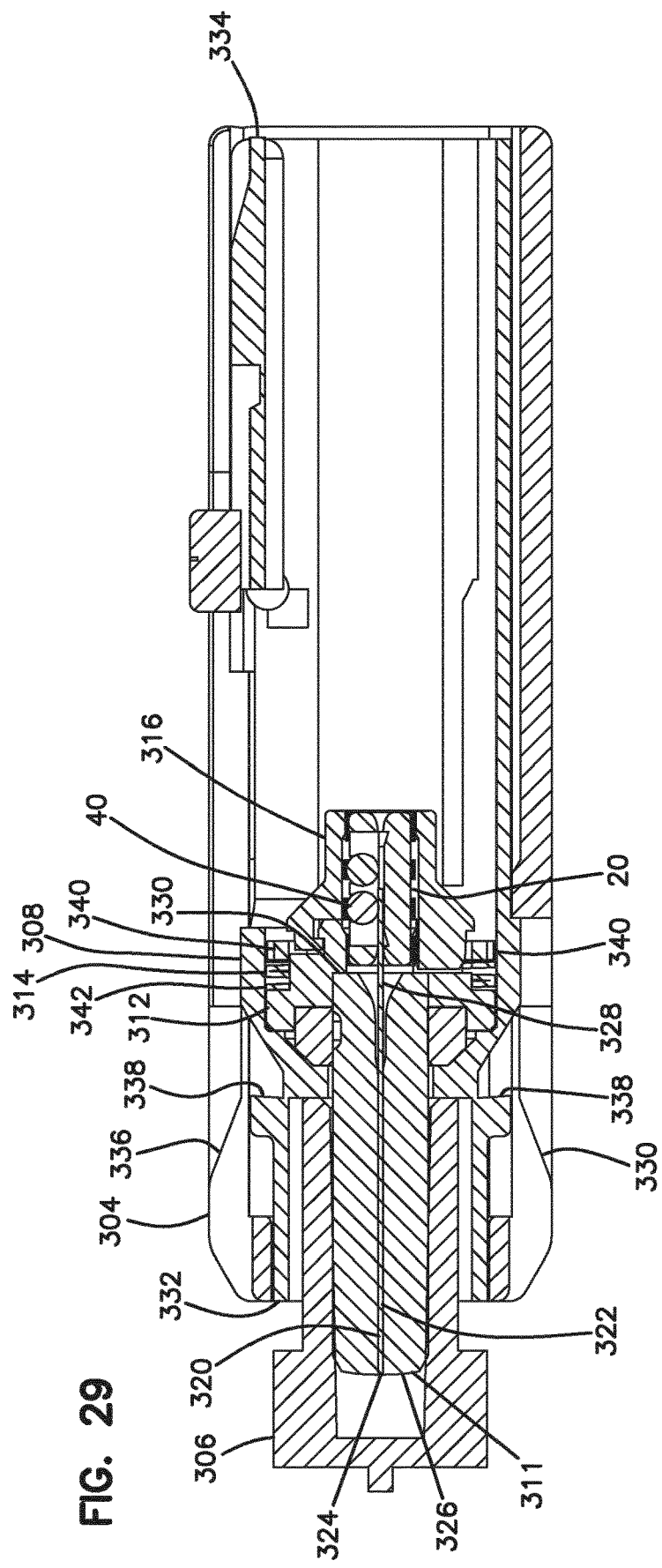
FIG. 29 is a cross-sectional view of the converter of FIG. 28.
Figure 30:
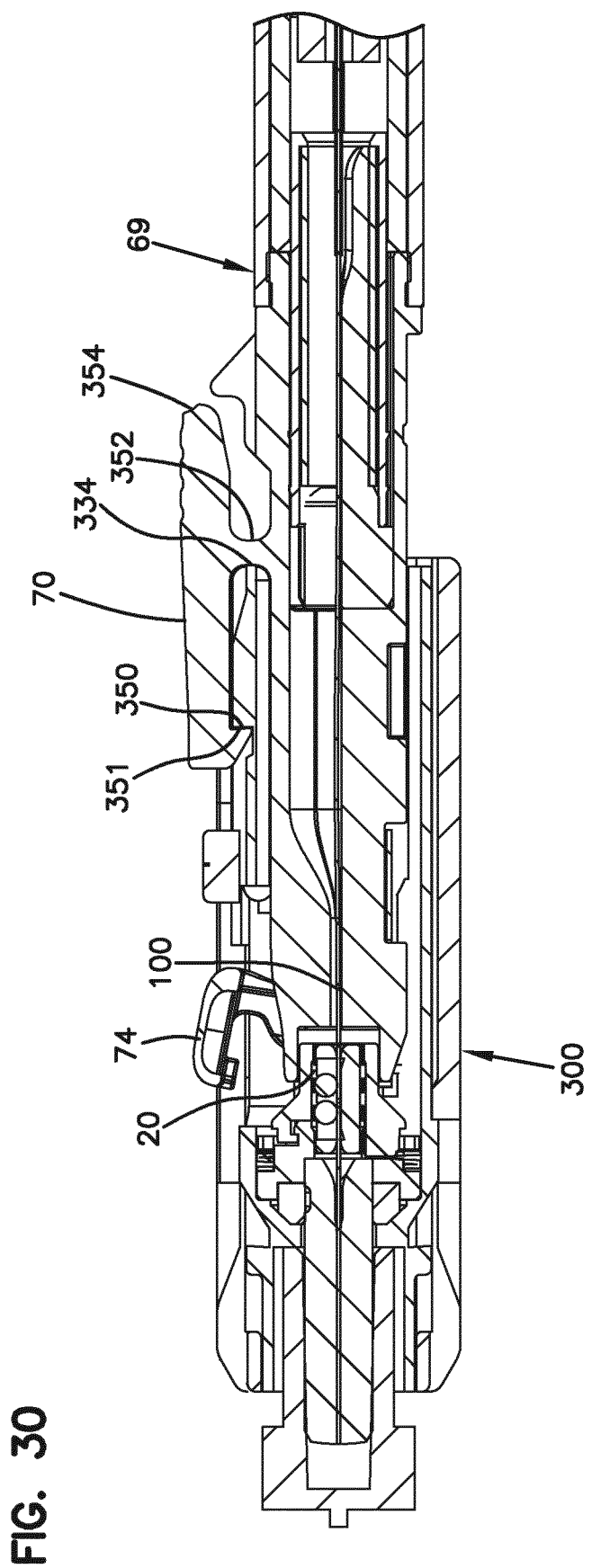
FIG. 30 is a cross-sectional view of the converter of FIG. 29 with the fiber optic connector of FIG. 20 inserted therein.
Figure 33:
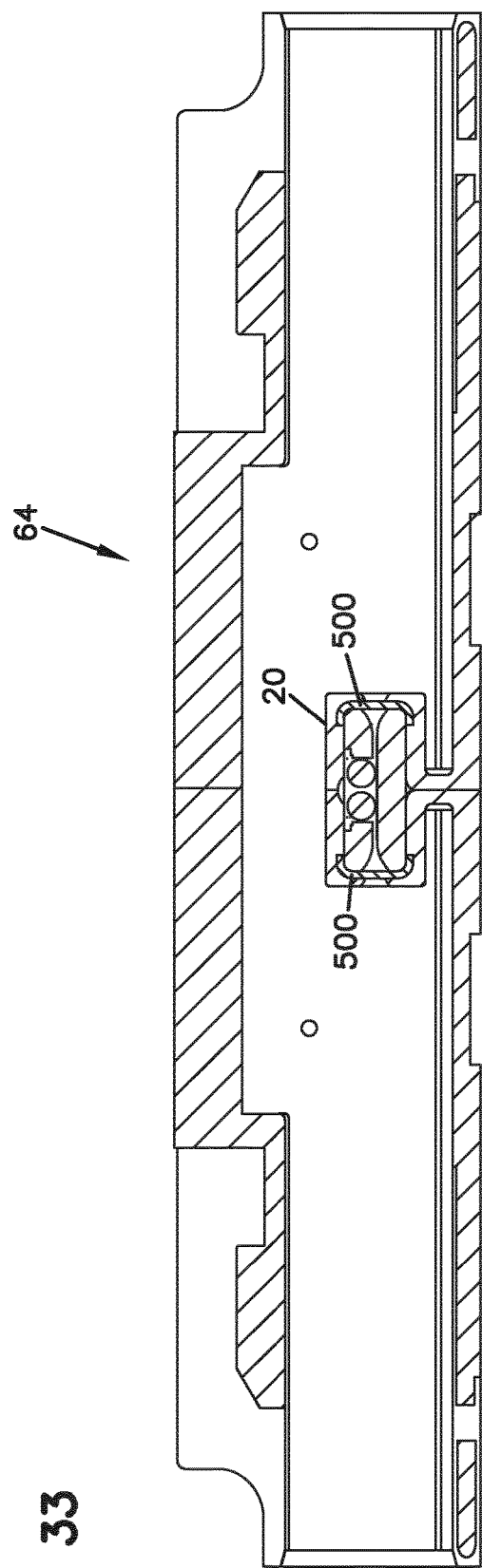
FIGS. 33 and 34 show a simplex fiber optic adapter in which one of the optical fiber alignment devices of FIG. 32 has been incorporated.
Figure 34:
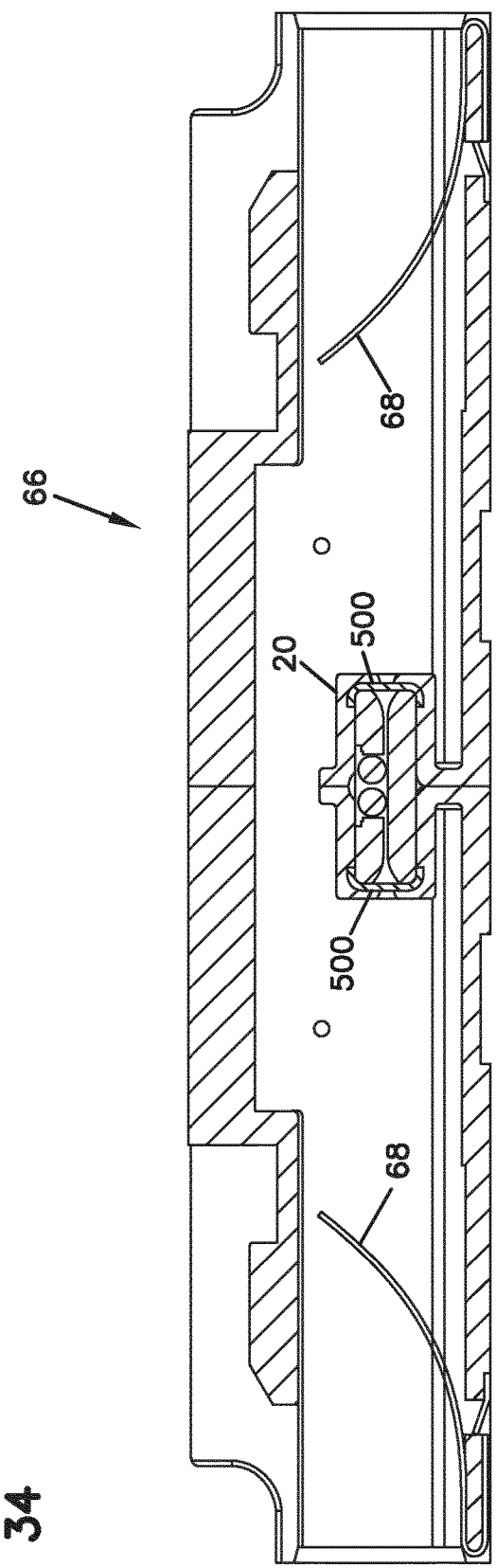

FIG. 26 shows a converter 300 in accordance with the principles of the present disclosure for converting the ferrule-less connector 69 to a ferruled connector. In the depicted embodiment, the ferruled connector has a SC-type footprint/shape/profile that mates with an SC-type fiber optic adapter 302 configured for interconnecting two ferruled SC-type connectors. As shown at FIGS. 27 and 28, the converter 300 includes an outer housing 304 (e.g., an SC-release sleeve that is pulled back to disengage the converter 300 from a standard SC adapter), a dust cap 306, an inner housing 308, a ferrule assembly 310 including a ferrule 311 and a ferrule hub 312 (i.e., a ferrule base) mounted to a back end of the ferrule 311, the fiber alignment device 20, a spring 314 for biasing the ferrule assembly 310 in a forward direction, and a retention cap 316 for securing the fiber alignment device 20 to the ferrule hub 312. As shown at FIG. 29, an optical fiber stub 320 is potted (e.g., adhesively secured) with a central bore 322 defined axially through the ferrule 311. The optical fiber stub 320 has a polished end 324 positioned adjacent a front end face 326 of the ferrule 311. The dust cap 306 can be mounted over the front end face 326 to protect the polished end 324 of the optical fiber stub 320 from damage or contamination. The optical fiber stub 320 includes a rear portion 328 that projects rearwardly from a rear end 330 of the ferrule 311. The rear portion 328 of the optical fiber stub 320 extends through the first funnel 36 of the optical fiber alignment device 20 and is shown pressed within the fiber alignment groove 32 by the first ball 40.

In certain embodiments, the spring 314 can be a spring washer such as a Belleville washer or a wave washer. In this way, the spring can provide its biasing function while being relatively compact in an axial direction.

Referring to FIGS. 28 and 29, the inner housing 308 includes a front end 332 and a rear end 334. The front end 332 forms a plug interface end compatible with a fiber optic adapter such as a standard SC adapter 302. The ferrule assembly 310 mounts with the inner housing 308 adjacent the front end 332 of the inner housing 308. The front end face 326 of the ferrule projects forwardly beyond the front end 332 of the inner housing 308 so as to be accessible for connection to another fiber optic connector. The outer housing 304 snaps over the inner housing 308 and has a limited range of axial movement relative to the inner housing 308. When front end 332 of the inner housing 308 is inserted into the fiber optic adapter 302, the ferrule 311 fits within an alignment sleeve of the fiber optic adapter 302 and latches of the adapter 302 engage upper and lower catches 338 of the inner housing 308 to lock the front end 332 of the inner housing 308 within the adapter 302. To release the inner housing 308 from the adapter 302, the outer housing 306 is retracted relative to the inner housing 308 such that upper and lower ramp surfaces 336 of the outer housing 306 disengage the latches of the adapter 302 from the catches 338 so that the inner housing 308 can be withdrawn from the adapter 302.

The ferrule assembly 310 and the spring 314 can be retained at the front end 332 of the inner housing 308 by a locking clip 340. The locking clip 340 can be side loaded into the inner housing 308 and captures the spring 314 and the ferrule hub 312 within the front end 332 of the inner housing 308. For example, the ferrule hub 312 and the spring 314 are captured between an inner shoulder 342 of the inner housing 308 and the locking clip 340. In this way, the spring biases the ferrule assembly 310 in a forward direction. During a connection, the ferrule assembly 310 can move rearwardly relative to the inner housing 308 against the bias of the spring 314 as the front end face 326 of the ferrule 311 contacts the end face of the ferrule of a mating connector inserted within the adapter 302. The locking clip 340 is preferably locked against axial movement relative to the inner housing 308. The hub assembly 310 has a range of axial movement relative to the inner housing 308 that is defined between the inner shoulder 342 and the locking clip 340. The alignment device 20 is mounted to the hub assembly 310. Thus, the alignment device 20 is carried with the hub assembly 310 as the hub assembly 310 moves axially relative to the inner housing 308. In one example, at least a portion of the alignment device fits inside a portion of the ferrule hub 312. For example, the ferrule hub 312 can define a receptacle 344 that receives one end of the alignment device 20. The retention cap 316 can snap-fit to a back end of the ferrule hub 312 and is configured to attach the alignment device 20 to the ferrule hub 312.

In use, the connector 69 is inserted into the converter 300 through the rear end 334 of the inner housing 308. When inserted within the inner housing 308, the ferrule-less end portion 100' of the optical fiber 100 of the connector 69 slides through the optical fiber cleaning layer 500 into the alignment device 20 and is co-axially aligned with and optically connected to the optical fiber stub 320 supported by the ferrule 311. The ferrule-less end portion 100' can extend through the second funnel 38 of the alignment structure 20 and can be pressed into the alignment groove 32 by the ball 41. The inner housing 308 can include structure for retaining the connector 69 within the rear end 334. For example, the inner housing 308 can include a catch 350 that engages the latch 70 of the connector 69. The latch 70 is connected to the main body 122 of the connector 69 by an interconnect piece 352. When the connector 69 is latched in the inner housing 308, the catch 350 opposes a latching surface 351 of the latch 70 and the rear end 334 opposes the interconnect piece 352 to limit axial movement between the connector 69 and the inner housing 308 in both inner and outer axial directions. By depressing a rear end 354 of the latch 70, the latching surface 351 can be disengaged from the catch 350 to permit removal of the connector 69. Contact between the rear end 334 of the inner housing 308 and the interconnect piece 352 limits the distance the connector 69 can be inserted into the inner housing 308. It will be appreciated that the inner housing 308 also includes structure for: a) moving the latching arms 206 of the connector 69 from the latching position to the release position; and b)

moving the shutter 74 of the connector 69 from the closed position to the open position. For example, as disclosed with regard to the fiber optic adapter 60, the inner housing 308 can include the release rails 230 and the shutter actuation post 234.

In other implementations, the optical cleaning membrane 500 can be used with optical fibers held (at least partially) by optical ferrules. In some such implementations, the optical cleaning membrane 500 may wipe across a portion of the ferrule (e.g., the tip of the ferrule) to perform a cleaning action. In other such implementations, a portion of the ferrule may pierce the optical cleaning membrane 500 to perform a cleaning action. In other such implementations, a portion of the optical fiber may extend past the tip of the ferrule. The portion of the optical fiber may pierce the cleaning membrane 500 as described above.

The above specification, examples and data provide a complete description of the manufacture and use of the composition of the invention. Since many embodiments of the invention can be made without departing from the spirit and scope of the invention, the invention resides in the claims hereinafter appended.

LIST OF REFERENCE NUMERALS AND CORRESPONDING FEATURES

20 optical fiber alignment device
22 fiber insertion axis
24 alignment housing
25 alignment device holder
25a, 25b parts of alignment device holder
26 first ends
27 seam
28 second ends
30 fiber alignment region
32 alignment groove
34 pocket
36 first funnel
38 second funnel
40 first ball
41 second ball
42 clip
44 first spring
45 second spring
50 connector
52 ferrule
54 optical fiber
56 dust cap
58 stub end
60 adapter
62 ports
64 adapter
66 adapter
68 shutters
69 fiber optic connectors
70 latches
71 catches
73 pivot axis
74 shutter
75 front cover portion
77 top portion
79 lever portion
100 optical fiber
100' ferrule-less free end portions
111 bare glass portion
112 fiber optic cable
113 coating layer
116 outer jacket
117 buffer tube
118 strength layer
119 fiber securement substrate
121 shape recoverable article
122 main connector body
123 front retention structure
124 front mating end
126 terminating end
130 rear insert
189 fiber alignment structures
190 fiber buckling region
206 latching arms
230 release rails
300 connector
302 fiber optic adapter
304 outer housing
306 dust cap
308 inner housing
310 ferrule assembly
311 ferrule
312 ferrule hub
314 spring
316 retention cap
320 optical fiber stub
322 central bore
324 polished end
326 front end face
328 rear portion
330 rear end
332 front end
334 rear end
336 ramp surfaces
338 catches
340 locking clip
342 inner shoulder
344 receptacle
350 catch
351 latching surface
352 interconnect piece
354 rear end
500 optical fiber cleaning layers
502 caps

What is claimed is:

1. An optical fiber alignment system comprising:
an alignment device defining a fiber insertion axis extending between first and second ends of the alignment device, the alignment device also defining a fiber alignment region disposed along the fiber insertion axis;
a first cleaning membrane disposed at the first end of the alignment device, the first cleaning membrane extending across the fiber insertion axis; and
a second cleaning membrane disposed at the second end of the alignment device, the second cleaning membrane extending across the fiber insertion axis so that the fiber alignment region is disposed between the first and second cleaning membranes; and
gel disposed within the alignment device and retained between the first and second cleaning membranes, the gel being a different material from the first and second cleaning membranes.

2. The optical fiber alignment system of claim 1, wherein the first and second cleaning membranes are secured by caps mounted on the first and second ends of the alignment housing.

3. The optical fiber alignment system of claim 1, wherein the first and second cleaning membranes are disposed at major diameters of funnels defined by the alignment device, the funnels leading to the fiber alignment region.

4. The optical fiber alignment system of claim 1, wherein the first and second cleaning membranes are formed from electrospun fibers.

5. The optical fiber alignment system of claim 1, wherein the first and second cleaning membranes are self-healing.

6. The optical fiber alignment system of claim 1, wherein the alignment device is disposed within a fiber optic adapter.

7. The optical fiber alignment system of claim 6, further comprising a plug connector carrying an optical fiber configured to pierce through the first cleaning membrane to enter the fiber alignment region when the plug connector is received at the fiber optic adapter.

8. The optical fiber alignment system of claim 7, further comprising a second plug connector carrying an optical fiber configured to pierce through the second cleaning membrane to enter the fiber alignment region when the second plug connector is received at the fiber optic adapter.

9. The optical fiber alignment system of claim 1, wherein the alignment device is disposed within a plug connector.

10. The optical fiber alignment system of claim 1, wherein each of the first and second cleaning membranes has a puncturing force of no more than 0.08 N.

11. The optical fiber alignment system of claim 1, wherein each of the first and second cleaning membranes has a thickness of about 50 mm to about 500 mm.

12. The optical fiber alignment system of claim 1, wherein each of the first and second cleaning membranes has a thickness of about 100 mm to about 400 mm.

13. The optical fiber alignment system of claim 1, wherein the gel includes thixotropic gel.

14. The optical fiber alignment system of claim 1, wherein each of the first and second cleaning membranes is configured to recover its original shape.

15. The optical fiber alignment system of claim 1, wherein each of the first and second cleaning membranes is disposed within the alignment device.

16. The optical fiber alignment system of claim 1, wherein each of the first and second cleaning membranes is disposed at an exterior of the alignment device.

17. The optical fiber alignment system of claim 1, further comprising a plug connector carrying an optical fiber configured to pierce through the first cleaning membrane to enter the fiber alignment region.

18. The optical fiber alignment system of claim 17, wherein the plug connector includes a ferrule that supports the optical fiber, wherein the ferrule is configured to wipe over the first cleaning membrane when the optical fiber pierces through the first cleaning membrane.

\* \* \* \* \*